(12) United States Patent
Obata et al.

(10) Patent No.: US 11,709,478 B2
(45) Date of Patent: Jul. 25, 2023

(54) PRODUCTION SYSTEM, PRODUCTION METHOD, AND INFORMATION STORAGE MEDIUM

(71) Applicant: Kabushiki Kaisha Yaskawa Denki, Kitakyushu (JP)

(72) Inventors: Shinichiro Obata, Kitakyushu (JP); Megumi Yasuda, Kitakyushu (JP); Takaaki Shogaki, Kitakyushu (JP); Yu Katono, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 17/355,207

(22) Filed: Jun. 23, 2021

(65) Prior Publication Data
US 2021/0405617 A1    Dec. 30, 2021

(30) Foreign Application Priority Data

Jun. 26, 2020  (JP) ................................. 2020-110416

(51) Int. Cl.
*G05B 19/4155* (2006.01)

(52) U.S. Cl.
CPC ............ *G05B 19/4155* (2013.01); *G05B 2219/31449* (2013.01)

(58) Field of Classification Search
None
See application file for complete search history.

(56) References Cited

U.S. PATENT DOCUMENTS

| 2003/0174070 | A1* | 9/2003 | Garrod .................. H04L 43/00 340/870.07 |
| 2007/0083483 | A1* | 4/2007 | Lawande ......... G06F 16/24561 |
| 2009/0089709 | A1* | 4/2009 | Baier .................. G05B 19/409 715/817 |
| 2012/0083906 | A1* | 4/2012 | Weatherhead ..... G05B 23/0267 700/83 |
| 2012/0242648 | A1* | 9/2012 | Baier .................. G05B 19/409 345/418 |

(Continued)

FOREIGN PATENT DOCUMENTS

| CN | 202267862 U | 6/2012 |
| CN | 107493265 B | 11/2018 |

(Continued)

OTHER PUBLICATIONS

Weber, "Applying Visual Basic for Human Machine Interface Applications", 1999, Software Toolbox, pp. 1, 4-5 (Year: 1999).*

(Continued)

*Primary Examiner* — Mohammad Ali
*Assistant Examiner* — David Earl Ogg
(74) *Attorney, Agent, or Firm* — HEA Law PLLC

(57) ABSTRACT

A production system, including an engineering device configured to set a higher-level control device capable of controlling a control device configured to control one or more industrial machines, wherein the engineering device is configured to: display a name of each of a plurality of variables stored in the higher-level control device; receive specification of a variable to be subjected to at least one of collection or rewriting from among the plurality of variables; and perform setting of the at least one of the collection or rewriting of the specified variable.

19 Claims, 10 Drawing Sheets

(56) References Cited

U.S. PATENT DOCUMENTS

| | | | |
|---|---|---|---|
| 2013/0254584 A1 | 9/2013 | Tamaoki | |
| 2014/0122374 A1* | 5/2014 | Hacigumus | G06Q 30/0283 |
| | | | 705/400 |
| 2016/0238659 A1 | 8/2016 | Shiromoto et al. | |
| 2017/0187625 A1* | 6/2017 | Nolan | H04L 47/263 |
| 2018/0299853 A1 | 10/2018 | Wang et al. | |
| 2019/0188049 A1* | 6/2019 | Choudhary | G06F 8/425 |
| 2020/0391422 A1 | 12/2020 | Giessauf | |
| 2021/0064011 A1* | 3/2021 | Gyota | H04L 67/12 |
| 2021/0064275 A1* | 3/2021 | Konishi | G06F 3/067 |
| 2021/0216047 A1 | 7/2021 | Sugiyama et al. | |

FOREIGN PATENT DOCUMENTS

| | | |
|---|---|---|
| DE | 102019105230 A1 | 9/2019 |
| JP | 2005141563 A | 6/2005 |
| JP | 2009245456 A | 10/2009 |
| JP | 2019159632 A | 9/2019 |
| JP | 2020052898 A | 4/2020 |
| WO | 2012081115 A1 | 6/2012 |
| WO | 2015/068210 A1 | 5/2015 |
| WO | 2019176336 A1 | 9/2019 |

OTHER PUBLICATIONS

Search Report dated Dec. 2, 2021, for corresponding EP Patent Application No. 21180625.2 pp. 1-9.
Office Action dated Apr. 19, 2022, for corresponding JP Patent Application No. 2020-110416 with partial English translation pp. 1-4.

* cited by examiner

FIG.3

DATA SHARING SETTING

UPDATE INFORMATION

DISCLOSED VARIABLES (265 item)

| UNIT NAME | INPUT/OUTPUT INFORMATION | TIER 1 | TIER 2 | TIER 3 | VARIABLE NAME | SHARING SETTING | |
|---|---|---|---|---|---|---|---|
| | | | | | | ☐ SELECT ALL COLLECTION | ☐ SELECT ALL REWRITING |
| CPU | - | - | - | - | OnCoil | ☑ | ☐ |
| CPU | - | CPU | Status | - | Ready | ☑ | ☐ |
| CPU | - | CPU | Status | - | Running | ☑ | ☐ |
| CPU | - | CPU | Status | - | Alarm | ☐ | ☐ |
| CPU | - | CPU | Status | - | Error | ☐ | ☑ |
| CPU | - | CPU | Status | - | MAlarm | ☐ | ☐ |
| CPU | - | CPU | Status | - | Flash | ☐ | ☐ |
| CPU | - | CPU | Status | - | WriteEnable | ☑ | ☑ |
| CPU | - | CPU | Status | - | FlashRequest | ☐ | ☐ |
| CPU | - | CPU | Status | - | SynchronizationStatus | ☑ | ☑ |
| CPU | - | CPU | Status | - | CPUMode | ☑ | ☐ |
| CPU | - | CPU | Status | - | CPUStopRequest | ☐ | ☐ |
| CPU | - | CPU | Status | - | StopRequest | ☐ | ☐ |
| CPU | - | CPU | Status | - | RunSwitch | ☐ | ☐ |
| CPU | - | CPU | Status | - | BatteryAlarm | ☐ | ☐ |
| CPU | - | CPU | Error | - | Failure | ☐ | ☐ |

DATA SHARING CAPACITY

☐ FIX DATA SHARING TIME  [SIMPLY CALCULATE USAGE RATE]

| SHARING SETTING | USAGE RATE |
|---|---|
| COLLECTION | 4% |
| REWRITING | 1% |

| ESTIMATED TIME OF DATA SHARING PROCESSING | MAXIMUM VALUE OF HIGH-SPEED SCAN TIME | SET VALUE OF HIGH-SPEED SCAN TIME |
|---|---|---|
| 0.2034ms | 2.0000ms | 4.0000ms |

[OK]  [CANCEL]  [APPLY]

FIG.4

DATA SHARING SETTING

UPDATE INFORMATION

DISCLOSED VARIABLES
(265item)

| UNIT NAME | INPUT/OUTPUT INFORMATION | TIER 1 | TIER 2 | TIER 3 | VARIABLE NAME | SHARING SETTING | |
|---|---|---|---|---|---|---|---|
| | | | | | | ☑SELECT ALL COLLECTION | ☑SELECT ALL REWRITING |
| | - | - | - | - | OnCoil | ☑ | ☑ |
| | CPU | - | Status | - | Ready | ☑ | ☑ |
| | CPU | - | Status | - | Running | ☑ | ☑ |
| | CPU | - | Status | - | Alarm | ☑ | ☑ |
| | CPU | - | Status | - | Error | ☑ | ☑ |
| | CPU | - | Status | - | MAlarm | ☑ | ☑ |
| | CPU | - | Status | - | Flash | ☑ | ☑ |
| | CPU | - | Status | - | WriteEnable | ☑ | ☑ |
| | CPU | - | Status | - | FlashRequest | ☑ | ☑ |
| | CPU | - | Status | - | SynchronizationStatus | ☑ | ☑ |
| | CPU | - | Status | - | CPUMode | ☑ | ☑ |
| | CPU | - | Status | - | CPUStopRequest | ☑ | ☑ |
| | CPU | - | Status | - | StopRequest | ☑ | ☑ |
| | CPU | - | Status | - | RunSwitch | ☑ | ☑ |
| | CPU | - | Status | - | BatteryAlarm | ☑ | ☑ |
| | CPU | - | Error | - | Failure | ☑ | ☑ |

DATA SHARING CAPACITY ☐ FIX DATA SHARING TIME

| SHARING SETTING | USAGE RATE |
|---|---|
| COLLECTION | 43% |
| REWRITING | 36% |

SIMPLY CALCULATE USAGE RATE

SET VALUE OF HIGH-SPEED SCAN TIME WILL BE EXCEEDED. REVIEW YOUR SETTINGS.

| ESTIMATED TIME OF DATA SHARING PROCESSING | MAXIMUM VALUE OF HIGH-SPEED SCAN TIME | SET VALUE OF HIGH-SPEED SCAN TIME |
|---|---|---|
| 2.6120ms | 2.0000ms | 4.0000ms |

[ OK ]  [ CANCEL ]  [ APPLY ]

| SET VALUE OF HIGH-SPEED SCAN TIME | MAXIMUM SHARED DATA SIZE | VARIABLE NAME | UNIT NAME | INPUT/OUTPUT INFORMATION | TIER 1 | TIER 2 | TIER 3 | COLLECTION FLAG | REWRITING FLAG |
|---|---|---|---|---|---|---|---|---|---|
| 4.0000ms | COLLECTION: 800Word REWRITING: 200Word | OnCoil | CPU | - | - | - | - | 1 | 0 |
| | | Ready | CPU | - | CPU | Status | - | 1 | 0 |
| | | Running | CPU | - | CPU | Status | - | 1 | 0 |
| | | Alarm | CPU | - | CPU | Status | - | 1 | 0 |
| | | ... | ... | ... | ... | ... | ... | ... | ... |

D

PRODUCTION SYSTEM, PRODUCTION METHOD, AND INFORMATION STORAGE MEDIUM

CROSS-REFERENCE TO RELATED APPLICATION

The present disclosure contains subject matter related to that disclosed in Japanese Priority Patent Application JP2020-110416 filed in the Japan Patent Office on Jun. 26, 2020, the entire contents of which are hereby incorporated by reference.

BACKGROUND OF THE INVENTION

1. Field of the Invention

The embodiments disclosed herein relate to a production system, a production method, and an information storage medium.

2. Description of the Related Art

In WO 2015/068210 A, there is described a system configured to collect trace data on an industrial machine controlled by a control device, upload the collected trace data to a cloud server, and request an analyst to analyze the trace data.

SUMMARY OF THE INVENTION

According to one aspect of the present disclosure, there is provided a production system, including an engineering device configured to set a higher-level control device capable of controlling a control device configured to control one or more industrial machines, wherein the engineering device is configured to: display a name of each of a plurality of variables stored in the higher-level control device; receive specification of a variable to be subjected to at least one of collection or rewriting from among the plurality of variables; and perform setting of the at least one of the collection or rewriting of the specified variable.

BRIEF DESCRIPTION OF THE DRAWINGS

FIG. 3 is a diagram for illustrating an example of the data sharing setting screen obtained when a user turns on check boxes.

FIG. 4 is a diagram for illustrating an example of the data sharing setting screen obtained when a total value of an estimated time of data sharing processing and a maximum value of a high-speed scan time exceeds a set value of the high-speed scan time.

FIG. 5 is a diagram for illustrating an example of the data sharing setting screen obtained when a time required for data sharing is fixed.

FIG. 8 is a table for showing a data storage example of setting content data.

DESCRIPTION OF THE EMBODIMENTS

[1. Overall Configuration of Production System]

Investigation has been underway to provide a technology for collecting and analyzing various variables stored in a higher-level control device capable of controlling a control device configured to control one or more industrial machines. When variables are collected and analyzed and when variables are rewritten based on analysis results, it is possible to improve accuracy of control and prevent occurrence of a failure in advance. In this respect, in the related art, a freely-selected variable among a plurality of variables stored in the higher-level control device cannot be subjected to at least one of collection or rewriting. As a result of extensive research and development for performing at least one of the collection or rewriting of a freely-selected variable desired by a user among the plurality of variables stored in the higher-level control device, the inventors have conceived of a novel and original engineering device and the like. Detailed description is now given of the engineering device and the like according to an embodiment of the present disclosure.

Figure 1:
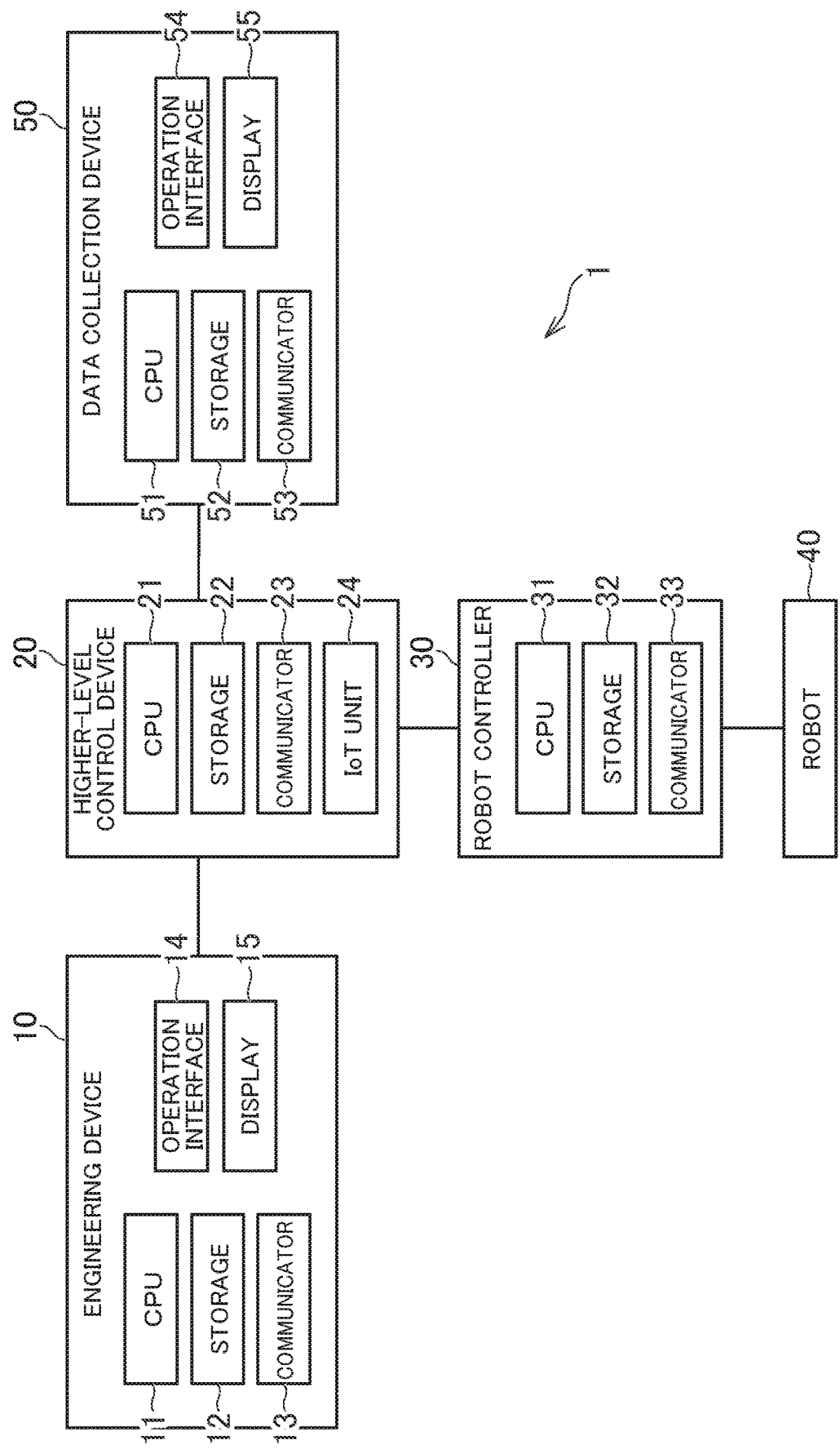
FIG. 1 is a diagram for illustrating an example of an overall configuration of a production system.

FIG. 1 is a diagram for illustrating an example of an overall configuration of a production system. As illustrated in FIG. 1, a production system 1 includes an engineering device 10, a higher-level control device 20, a robot controller 30, a robot 40, and a data collection device 50. In FIG. 1, each device is illustrated as one device, but may be provided as a plurality of devices.

Each device included in the production system 1 can be connected to any network. In this embodiment, a case in which the devices are connected to one another through a general network, for example, an Ethernet (trademark), is described, but the devices may be connected to one another through a network for industrial machines. For example, the devices may be connected to one another through different kinds of networks in such a manner that the higher-level control device 20, the engineering device 10, and the data collection device 50 are connected to one another through the general network, and that the higher-level control device 20 and the robot controller 30 are connected to each other through the network for industrial machines.

The engineering device 10 is a computer configured to set the higher-level control device 20 capable of controlling the robot controller 30 configured to control one or more robots 40. For example, the engineering device 10 is a personal computer, a cellular phone (including a smartphone), or a mobile terminal (including a tablet terminal). The engineering device 10 may be configured to set a device other than the higher-level control device 20.

In the engineering device 10, an engineering tool for supporting the user's setting work is installed. For example, the engineering tool is used for various purposes such as creation of a program, parameter setting, communication setting between devices, definition of a register, and definition of a variable. The engineering device 10 includes a CPU 11, a storage 12, a communicator 13, an operation interface 14, and a display 15.

The CPU 11 includes at least one processor. The CPU 11 is a kind of circuitry. The storage 12 includes a RAM or a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The higher-level control device 20 is a computer capable of controlling another device. The higher-level control device 20 is only required to have a function of controlling another device, and is not always required to control another device. For example, the higher-level control device 20 may only collect data from the robot controller 30 without controlling the robot controller 30. The entire production system 1 may be referred to as "cell," which is a unit smaller than a line, and in this case, the higher-level control device 20 may be referred to as "cell controller." The higher-level control device 20 may correspond to a kind of programmable logic controller (PLC).

In this embodiment, the higher-level control device 20 can control the robot controller 30. For example, the higher-level control device 20 may be capable of controlling a plurality of robot controllers 30. Further, for example, the higher-level control device 20 may be capable of controlling a plurality of devices being mutually different kinds of devices. The number and kinds of devices to be controlled by the higher-level control device 20 are not limited to the examples of this embodiment, and any number and any kinds of devices may be set as devices to be controlled.

The higher-level control device 20 includes a CPU 21, a storage 22, a communicator 23, and an IoT unit 24. The physical configuration of each of the CPU 21, the storage 22, and the communicator 23 may be the same as that of the CPU 11, the storage 12, and the communicator 13, respectively. The IoT unit 24 is a unit for transmitting data to another computer through the network. For example, the IoT unit 24 includes a CPU, a storage, and a communicator. The physical configuration of each of the CPU, the storage, and the communicator that are included in the IoT unit 24 may be the same as that of each of the CPU 11, the storage 12, and the communicator 13, respectively.

The CPU 21, the storage 22, and the communicator 23 may be included in a first casing (hereinafter referred to as "CPU unit") of the higher-level control device 20, and the IoT unit 24 may be included in a second casing (hereinafter referred to as "IoT unit") of the higher-level control device 20. In this case, the engineering device 10 can be connected to each of the CPU unit and the IoT unit. The user may connect the engineering device 10 to the CPU unit, or may connect the engineering device 10 to the IoT unit.

The robot controller 30 is a computer configured to control the robot 40. The robot controller 30 is an example of the control device. Accordingly, the term "robot controller 30" as used in this embodiment can be read as "control device." The control device may be any kind of device that is configured to control an industrial machine described later. For example, the control device may be a PLC, a motion controller, a motor controller, an inverter, a converter, a machine tool, a conveyance device, or a semiconductor manufacturing apparatus. The control device can control any number of industrial machines. The control device may control only one industrial machine, or may control a plurality of industrial machines. The control device corresponds to a higher-level device for an industrial machine. The higher-level control device 20 may control the control device, and thus corresponds to a device on a higher level than the control device.

The robot 40 is an industrial robot controlled by the robot controller 30. For example, the robot 40 includes a robot arm, a robot hand, a motor, and a sensor. It suffices that the sensor is a sensor capable of detecting a physical quantity, and the sensor may be, for example, a motor encoder, a torque sensor, a motion sensor, a grip sensor, a vision sensor, or a temperature sensor. The robot 40 is an example of the industrial machine. Accordingly, the term "robot 40" as used in this embodiment can be read as "industrial machine." The industrial machine is a collective term for machines configured to assist or substitute human work and peripheral machines thereof. For example, an industrial robot, a servo amplifier, or a motor corresponds to the industrial machine. In a broader sense, the higher-level control device 20, the robot controller 30, and the sensor are each a kind of industrial machine as well.

The data collection device 50 is a computer configured to collect data in the production system 1. The data collection device 50 is a personal computer, a server computer, a cellular phone (including a smartphone), or a mobile terminal (including a tablet terminal). The data collection device 50 includes a CPU 51, a storage 52, a communicator 53, an operation interface 54, and a display 55. The physical configuration of each of the CPU 51, the storage 52, the communicator 53, the operation interface 54, and the display 55 may be the same as that of each of the CPU 11, the storage 12, the communicator 13, the operation interface 14, and the display 15, respectively.

The programs and data described as being stored in each of the engineering device 10, the higher-level control device 20, the robot controller 30, the robot 40, and the data collection device 50 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

Further, for example, the higher-level control device 20 may be connected to an industrial machine, for example, a robot directly controlled by the higher-level control device 20. Further, for example, the higher-level control device 20 and the robot controller 30 may each include a circuit referred to as "FPGA" or "ASIC." Further, for example, the higher-level control device 20 and the robot controller 30 may each be connected to the above-mentioned sensor, the input/output device, or the like.

[2. Outline of Production System]

The higher-level control device 20 in this embodiment is configured to control the robot controller 30 based on each of the plurality of variables. The variable is information referred to by a control program for controlling the robot controller 30. The control program may also rewrite the variable. For example, the variable indicates a result of unfinished calculation, presence or absence of an alarm, or a physical quantity detected by a sensor (for example, a torque value detected by a torque sensor or a rotation speed of a motor detected by a motor encoder).

For example, when the robot controller 30 executes a plurality of processes in a predetermined order, an execution order of the processes is described in the control program. The higher-level control device 20 sends an instruction to the robot controller 30 based on the control program. The variable may be used as an execution condition of the process. For example, the robot controller 30 stores a variable for starting the process, a variable for suspending the process, or a variable for ending the process. The variable may be referred to as "input/output variable."

The "process" is a task or an operation to be performed by the robot controller 30. The process may be composed of only one task, or may be composed of a combination of a plurality of tasks. The process may have any content in accordance with the use of the robot controller 30. For example, the process is recognition of a workpiece, gripping of a workpiece, opening/closing of a door, setting of a workpiece, or machining using a machine tool. The robot controller 30 performs at least one process. The number of processes to be performed by the robot controller 30 may be any number. The robot controller 30 may perform only one process, or may perform a plurality of processes. The robot controller 30 performs the process based on the instruction received from the higher-level control device 20 and a device program stored in the robot controller 30 itself.

The device program is a program defining an operation of the robot controller 30. In the device program, each procedure of each process is defined. The device program can be created in any language in accordance with the robot controller 30, and is created in, for example, a ladder language or a robot language. In this embodiment, a device program is prepared for each process. Accordingly, when a certain robot controller 30 is to perform "n" processes ("n" is a natural number), the robot controller 30 stores at least "n" device programs.

A type of a variable is not limited to the above-mentioned example. For example, there may be a variable indicating a command sent from the higher-level control device 20 to the robot controller 30. Further, for example, there may be another variable indicating the start of execution of a command indicated by one variable. Further, for example, there may be a variable indicating a name of a job to be executed by the robot controller 30 and an execution condition therefor. Further, for example, there may be a variable indicating a response sent from the robot controller 30 to the higher-level control device 20. Further, for example, there may be a variable that does not directly relate to control of the robot controller 30.

The user operates the engineering device 10 to set the higher-level control device 20 storing such variables as described above. The term "user" as used in this embodiment means a user of the higher-level control device 20. The user of the higher-level control device 20 may be the same as a user of the robot controller 30 and a user of the data collection device 50, but in this embodiment, a case in which those users are different is described.

For example, the variables stored in the higher-level control device 20 include variables corresponding to the user's know-how as well. Accordingly, some variables are not disclosed to the user of the data collection device 50. Further, for example, the user of the data collection device 50 may not grasp details of the variables. Accordingly, some variables are desired not to reflect analysis results of the data collection device 50.

In view of this, the user of the higher-level control device 20 uses the engineering tool installed in the engineering device 10 to perform data sharing setting for variables between the higher-level control device 20 and the data collection device 50. For example, when the user operates the engineering device 10 to activate the engineering tool, a menu screen for performing various kinds of setting is displayed on the display 15. When the user selects an icon for setting data sharing from the menu screen, a data sharing setting screen is displayed on the display 15.

Figure 2:
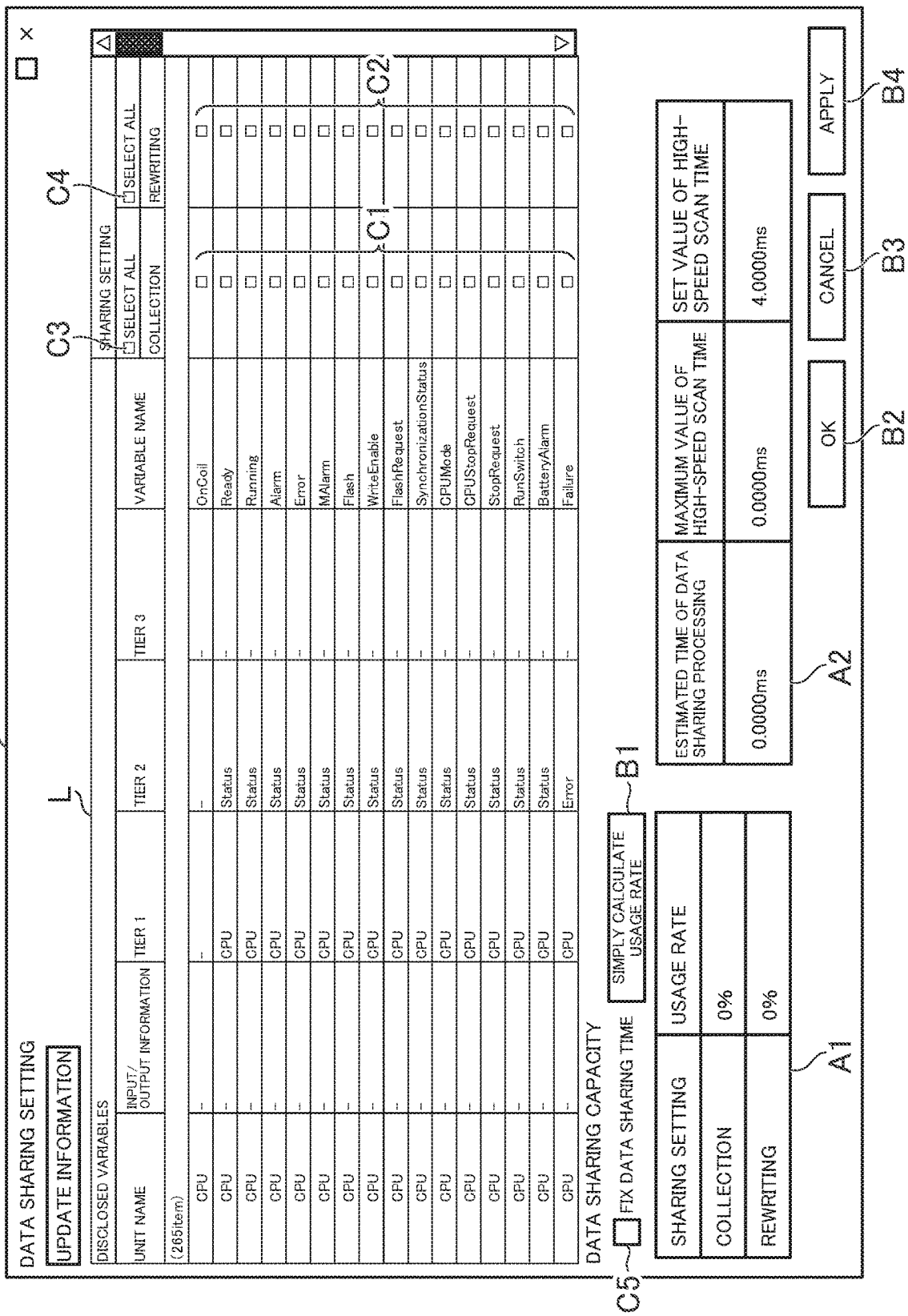
FIG. 2 is a diagram for illustrating an example of a data sharing setting screen.

FIG. 2 is a diagram for illustrating an example of the data sharing setting screen. As illustrated in FIG. 2, on a data sharing setting screen G, a list L of variables stored in the higher-level control device 20 is displayed. For example, in the list L, contents of a unit name, input/output information, tier names (tiers 1 to 3 of FIG. 2), a variable name, and a sharing setting are displayed. The unit name is a name of a unit in which a variable is stored. In this embodiment, a variable is stored in the memory included in the CPU 21 of the higher-level control device 20, and hence the unit name of "CPU" is displayed in FIG. 2. When a variable is stored in another unit, the name of the another unit is displayed as the unit name. In this embodiment, a case in which data sharing is achieved between the CPU unit and the IoT unit is described, but the data sharing may be achieved between the IoT unit and another unit. For example, the data sharing may be achieved between a robot controller unit and the IoT unit.

The input/output information indicates an attribute name of a variable when the variable has any one of an input attribute and an output attribute. The input attribute means that the variable corresponds to input to the higher-level control unit 20. The output attribute means that the variable corresponds to output from the higher-level control device 20. For example, when the higher-level control device 20 directly controls another device, the output attribute is given to a variable indicating an instruction directed to another device. The input attribute is given to a variable indicating a response from another device. In this embodiment, the input attribute and the output attribute are not used for the sake of simplicity of the description. Accordingly, in the example of FIG. 2, nothing is displayed as the input/output information.

The tier name is a name of a tier given to the variable. The tiers are information for classifying variables. The classification of variables is defined in a hierarchical structure. In this embodiment, a two-tier hierarchy is described, but the hierarchy may have three or more tiers. The first-stage tier indicates an upper class, and the second-stage tier indicates a lower class. In the example of FIG. 2, it is possible to display up to the third-stage tier name, but in this embodiment, the third-stage tier is not used, and hence nothing is displayed as the third-stage tier.

The variable name is a name of a variable. It suffices that the variable name is information that can identify the variable, and the variable name is represented by, for example, a character string that can be visually identified by a human, a symbol string, for example, an ID, or a register number corresponding to the variable. The variable name may be specifiable by the user, or may be a default name determined in advance. For example, the user uses the engineering tool to create a variable definition. The variable definition is a file for defining each of the variables used in the production system 1. Examples described in the variable definition include the variable name, the register number corresponding to the variable, the unit name of the unit in which the variable is stored, the input/output information on the variable, the tier name of the variable, a program that, for example, refers to the variable, and a comment indicating supplementary description of the variable.

The sharing setting of each of the variables displayed in the list L of FIG. 2 is information indicating whether or not to perform data sharing. The data sharing means at least one of collection or rewriting of each variable. In this embodiment, a case in which the variables can be both collected and rewritten is described, but there may be variables that can only be collected, or there may be variables that can only be rewritten.

The collection of the variable refers to causing another device to acquire the variable stored in the higher-level control device 20. In this embodiment, the collection of the variable stored in the CPU 21 which is performed by the data collection device 50 corresponds to the collection of the variable. More specifically, the variable stored in the CPU 21 is copied to the IoT unit 24 and then transmitted to the data collection device 50, and hence the collection of the variable copied to the IoT unit 24 which is performed by the data collection device 50 corresponds to the collection of the variable. When the IoT unit 24 is omitted, the variable stored in the CPU 21 may be directly transmitted to the data collection device 50. Further, the device for collecting the variable may be a device other than the data collection device 50.

The rewriting of the variable refers to updating the variable stored in the higher-level control device 20 based on an external instruction. The rewriting can also be said to be overwriting. When a given variable or another variable is rewritten based on a result of analyzing the given variable, the rewriting of the variable can also be said to be feedback. The rewriting of the variable may change a value of the given variable, or may not change the value by chance.

In this embodiment, the rewriting of the variable stored in the CPU 21 based on an instruction sent from the data collection device 50 corresponds to the rewriting of the variable. More specifically, the variable instructed to be rewritten by the data collection device 50 is written to the IoT unit 24 and then copied to the CPU 21, and hence the copying of the variable written to the IoT unit 24 to the CPU 21 corresponds to the rewriting of the variable. When the IoT unit 24 is omitted, the variable instructed to be rewritten by the data collection device 50 may be directly written to the CPU 21. Further, the rewriting of the variable may be instructed by a device other than the data collection device 50, or may be instructed by the IoT unit 24.

As illustrated in FIG. 2, a check box C1 for specifying whether or not to collect the variable and a check box C2 for specifying whether or not to rewrite the variable are displayed for each variable. In this embodiment, checking the check box is described as turning on the check box, and unchecking the check box is described as turning off the check box.

For example, the user can specify a variable having a given variable name as a collection target by turning on the check box C1 in the same line as that of the given variable name. Further, for example, the user can specify a variable having a given variable name as a rewriting target by turning on the check box C2 in the same line as that of the given variable name. The example of FIG. 2 indicates a state in which the check boxes C1 and C2 of none of the variables are checked.

The higher-level control device 20 stores a large number of variables, and hence a check box C3 for collectively specifying the on or off of the check box C1 and a check box C4 for collectively specifying the on or off of the check box C2 are displayed in the list L in order to reduce an operation load on the user. For example, when the user turns on the check box C3, the check boxes C1 of all the displayed variables are turned on. Further, for example, when the user turns on the check box C4, the check boxes C2 of all the displayed variables are turned on.

For example, in a display area A1 of the data sharing setting screen G, a usage rate of the CPU 21 estimated to be required for collecting the variables and a usage rate of the CPU 21 estimated to be required for rewriting the variables are displayed. For example, when the user selects a button B1, estimated values corresponding to the variables for which the check boxes C1 and C2 are turned on are calculated and displayed in the display area A1. In the example of FIG. 2, the check boxes C1 and C2 of none of the variables are turned on, and hence the usage rates are 0%.

Further, for example, in a display area A2 of the data sharing setting screen G, an estimated time of the data sharing processing, a maximum value of a high-speed scan time, and a set value of the high-speed scan time are displayed.

The estimated time of the data sharing processing is a time estimated to be required for the data sharing. In this embodiment, the variables are copied between the CPU 21 and the IoT unit 24, and hence the time required for copying is displayed in the display area A2 as the estimated time of the data sharing processing. In the example of FIG. 2, the check boxes C1 and C2 of none of the variables are turned on, and hence the estimated time of the data sharing processing is 0 ms. Instead of displaying a total value of the estimated time of the collection and the estimated time of the rewriting, the estimated time of the collection and the estimated time of the rewriting may be displayed separately.

The maximum value of the high-speed scan time is a time required for processing other than the data sharing processing. The other processing may be any processing, for example, execution of a control program, processing in which the higher-level control device 20 reads data stored in the storage 22, or communication processing between the higher-level control device 20 and the robot controller 30. The maximum value of the high-speed scan time may be an actually measured value or may be an estimated value. In this embodiment, a case in which the maximum value of the high-speed scan time is an actually measured value corresponding to an actual result of executing the control program is described.

The user can also use the engineering tool to perform the setting work even when offline. The term "offline" refers to a state in which the engineering device 10 and the higher-level control device 20 are not connected to each other. When offline, the actually measured value of the control program is not measured, and hence the maximum value of the high-speed scan time is 0 ms as illustrated in FIG. 2. When the user connects the engineering device 10 and the higher-level control device 20 to each other to start the setting work online, the actually measured value of the maximum value of the high-speed scan time is displayed in the display area A2.

The set value of the high-speed scan time is a scan cycle period (update cycle period or copy cycle period) of the variables. In this embodiment, the variables are scanned regularly (periodically). In this embodiment, variables are copied between the CPU 21 and the IoT unit 24. Accordingly, the scan can also be said to be synchronization or achievement of consistency. That is, the variables stored in the CPU 21 and the variables stored in the IoT unit 24 are regularly subjected to the synchronization or the achievement of consistency.

For example, the variable for which the check box C1 is checked is copied from the CPU 21 to the IoT unit 24.

Meanwhile, for example, the variable for which the check box C2 is checked is copied from the IoT unit 24 to the CPU 21. The variable for which both the check boxes C1 and C2 are checked are copied from the CPU 21 to the IoT unit 24 unless an instruction for the rewriting is received from the data collection device 50, and is copied from the IoT unit 24 to the CPU 21 in a cycle period in which the instruction for the rewriting is received or in the subsequent cycle period. In the example of FIG. 2, the set value of the high-speed scan time is 4 ms, and the variables are scanned between the CPU 21 and the IoT unit 24 every 4 ms.

FIG. 3 is a diagram for illustrating an example of the data sharing setting screen G obtained when the user turns on the check boxes C1 and C2. As illustrated in FIG. 3, when the user turns on the freely-selected check boxes C1 and C2 and selects the button B1, the engineering device 10 calculates the usage rates of the CPU 21 and the estimated time of the data sharing processing based on the variables for which the check boxes C1 and C2 are turned on, and displays the usage rates and the estimated time in the display areas A1 and A2, respectively. In the example of FIG. 3, the user is performing the setting work online, and the engineering device 10 acquires the actually measured value corresponding to the actual result of executing the control program, and displays the actually measured value in the display area A2 as the maximum value of the high-speed scan time. A numerical value freely specified by the user is displayed as the set value of the high-speed scan time.

As the number of variables for which the user turns on the check boxes C1 and C2 increases, the number of variables to be collected and to be rewritten increases as well, and hence the usage rates of the CPU 21 and the estimated time of the data sharing processing each increase. For example, when the usage rates of the CPU 21 approach 100%, an operation of the higher-level control device 20 may be hindered. Further, for example, when the total value (2.2034 ms in the example of FIG. 3) of the estimated time of the data sharing processing and the maximum value of the high-speed scan time exceeds the set value of the high-speed scan time (4 ms in the example of FIG. 3), the operation of the higher-level control device 20 may be hindered.

FIG. 4 is a diagram for illustrating an example of the data sharing setting screen G obtained when the total value of the estimated time of the data sharing processing and the maximum value of the high-speed scan time exceeds the set value of the high-speed scan time. As illustrated in FIG. 4, when the user turns on both the check boxes C3 and C4 to set all the variables as the collection targets and the rewriting targets, the usage rates of the CPU 21 which are displayed in the display area A1 become higher, and the estimated time of the data sharing processing which is displayed in the display area A2 becomes longer as well.

In the example of FIG. 4, the total value of the estimated time of the data sharing processing and the maximum value of the high-speed scan time exceeds the set value of the high-speed scan time, and hence a message M to that effect is displayed. When the message M is displayed, the user unchecks some check boxes so as to prevent the total value of the estimated time of the data sharing processing and the maximum value of the high-speed scan time from exceeding the set value of the high-speed scan time. The message M may be displayed when the usage rates of the CPU 21 exceed a threshold value.

The user specifies desired variables as the collection targets and the rewriting targets so as to prevent the message M from being displayed. When the user selects the button B2, setting contents specified by the user are reflected in the higher-level control device 20, and the data sharing setting screen G is closed. When the user selects a button B3, the data sharing setting screen G is closed without reflecting the setting contents specified by the user. When the user selects a button B4, the setting contents specified by the user are reflected in the higher-level control device 20, and the data sharing setting screen G remains displayed.

In this embodiment, when the user checks a check box C5, a time required for the data sharing processing is fixed. By fixing this time, the user can perform the setting work without being distracted by variations in time required for the data sharing processing.

Figure 5:
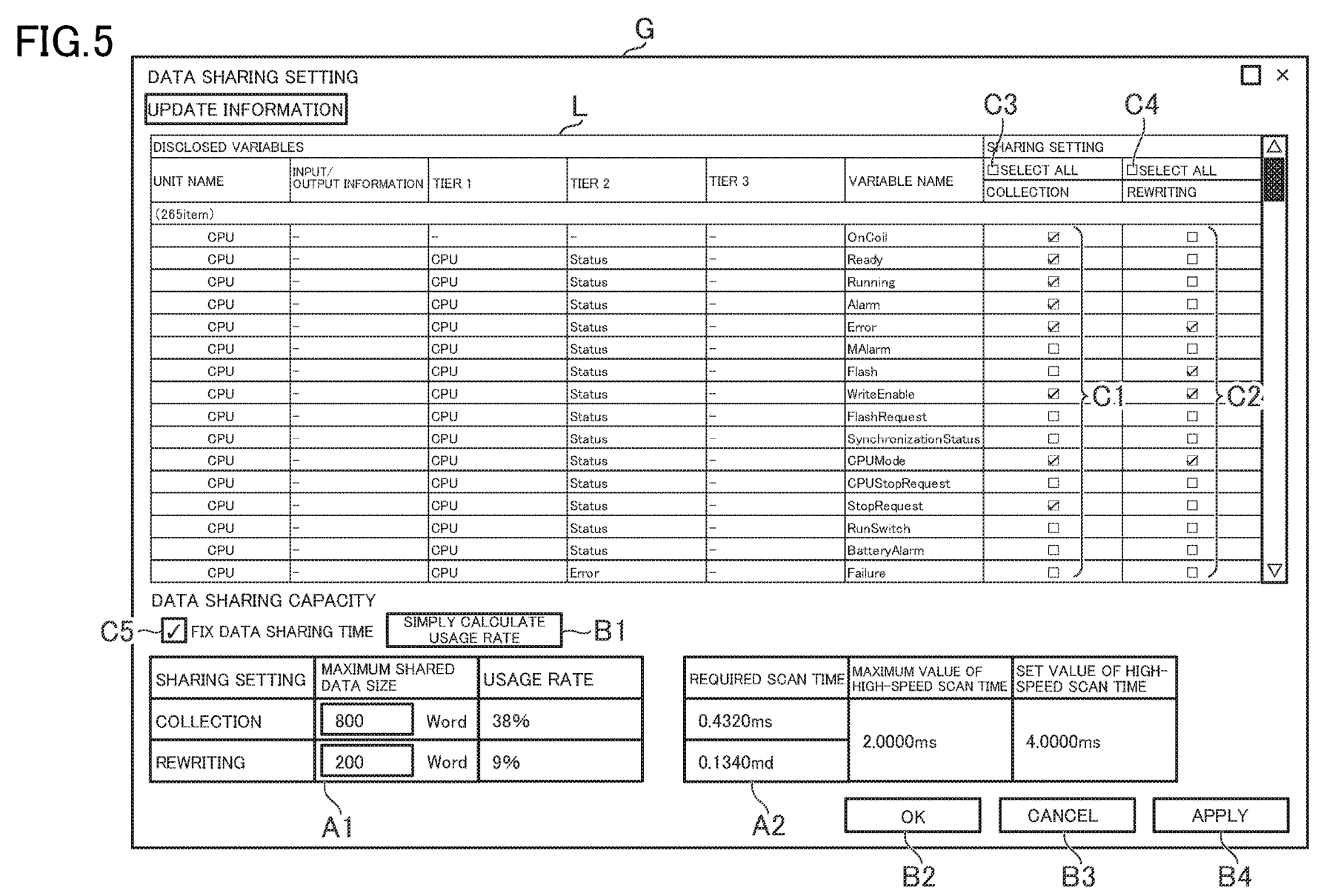

FIG. 5 is a diagram for illustrating an example of the data sharing setting screen G obtained when the time required for the data sharing is fixed. As illustrated in FIG. 5, when the user turns on the check box C5, maximum shared data sizes and the usage rates of the CPU 21 are displayed in the display area A1. The maximum shared data size is a maximum data size allowed for each of the collection and rewriting of the variables. The user can specify a numerical value for the maximum shared data size. In the example of FIG. 5, a case in which the number of words is specified as the data size is described, but the data size may be specified by another numerical value, for example, the number of bytes.

The user can specify any numerical value as the maximum shared data size. The usage rates of the CPU 21 which are displayed in the display area A1 are numerical values corresponding to the maximum shared data sizes specified by the user. As the maximum shared data size specified by the user becomes larger, estimated values of the usage rates of the CPU 21 become larger as well. The user specifies the maximum shared data sizes so as to prevent the usage rates of the CPU 21 from exceeding a threshold value.

In the display area A2, required scan times are displayed in place of the estimated time of the data sharing processing. Each required scan time is a value corresponding to each maximum shared data size specified by the user. As the maximum shared data size specified by the user becomes larger, the required scan time becomes longer. The maximum value and the set value of the high-speed scan time which are displayed in the display area A2 are as described above. The user specifies the maximum shared data sizes so as to prevent the total value of the required scan times and the maximum value of the high-speed scan time from exceeding the set value of the high-speed scan time.

When the time required for the data sharing is fixed as illustrated in FIG. 5, limitations may be imposed on the check boxes C1 to C4 so as to prevent the check boxes for variables larger than the maximum shared data size from being turned on. Instead of imposing such limitations, the same message M as that presented in FIG. 4 may be displayed when the usage rates of the CPU 21 exceeds the threshold value or the total value of the required scan times and the maximum value of the high-speed scan time exceeds the set value of the high-speed scan time. The user operates the check boxes C1 to C4 so as to prevent the message M from being displayed.

In this embodiment, the user can specify the tier names of the variables to be displayed on the data sharing setting screen G. When the user specifies a tier name, the variables having that tier name are filtered and displayed. Variables having tier names that are not specified by the user are not displayed on the data sharing setting screen G. Accordingly, the user can collectively turn on or off the variables having a given tier name by selecting the check boxes C3 and C4 after specifying the given tier name to perform the filtering.

Figure 6:
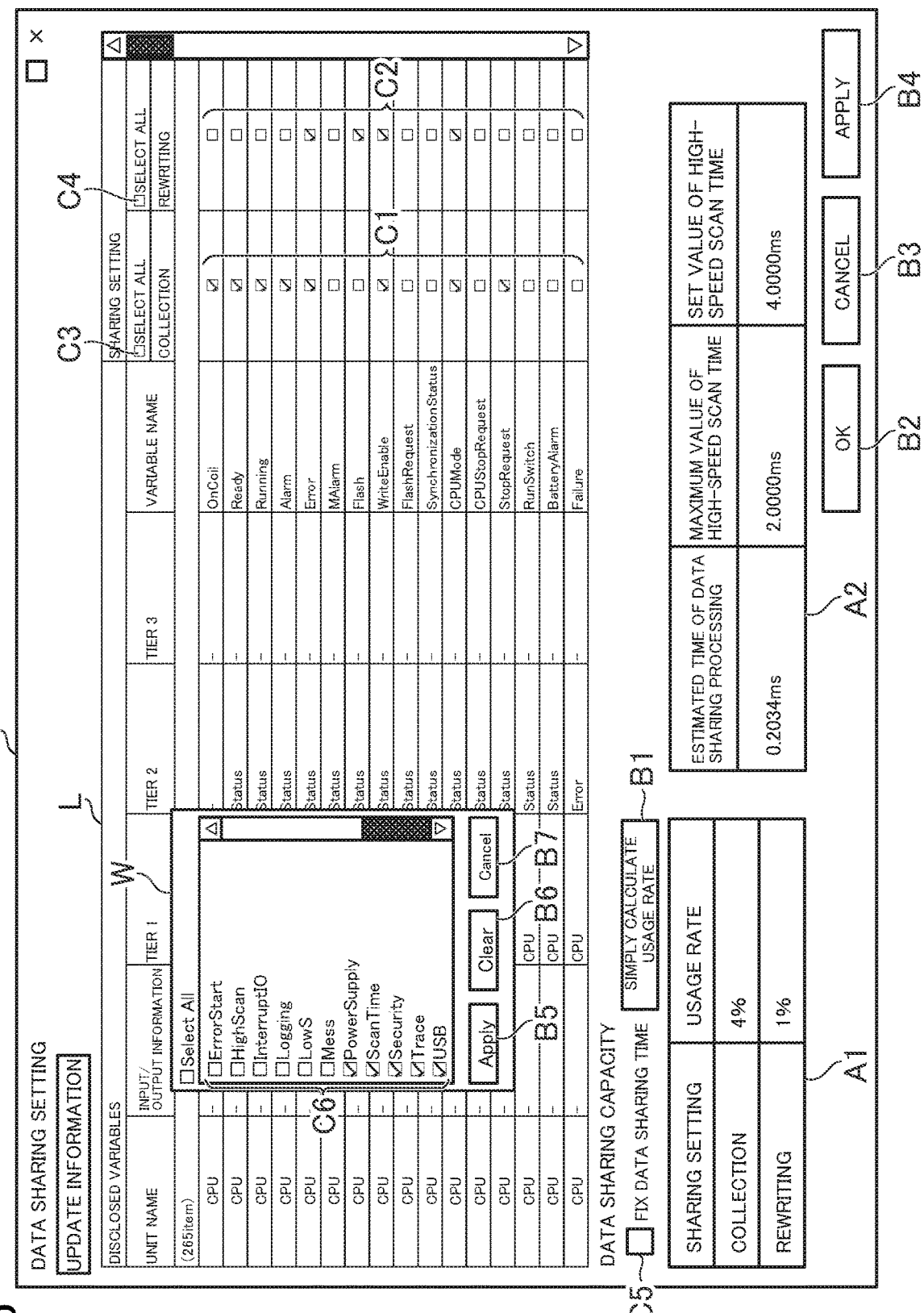
FIG. 6 is a diagram for illustrating an example of the data sharing setting screen obtained when filtering is executed by the user specifying tier names.

FIG. 6 is a diagram for illustrating an example of the data sharing setting screen G obtained when the filtering is executed by the user specifying tier names. As illustrated in FIG. 6, for example, when the user selects a tier 1 in the list L, a window W showing tier names of the tier 1 is displayed. The user can turn on or off a check box C6 of any tier name displayed in the window W. In the window W, a check box for collectively turning on or off the tier names may be displayed. When the user selects a button B5, the variables having the tier name for which the check box C6 is turned on are filtered and displayed on the data sharing setting screen G.

When the user selects a button B6, the filtering is canceled to display all the variables on the data sharing setting screen G. When the user selects a button B7, the state returns to a state before the window W is displayed. A case in which the tier 1 is selected is described with reference to FIG. 6, but a tier 2 or a tier 3 may be selected to perform the filtering. That is, the user may perform the filtering in an upper tier or perform the filtering in a lower tier.

As described above, the user can perform at least one of the collection or rewriting of a freely-selected variable desired by the user among the plurality of variables stored in the higher-level control device 20 by performing the setting work through the data sharing setting screen G of the engineering tool. Now, the production system 1 is described in detail.

[3. Functions Implemented in Production System]

Figure 7:
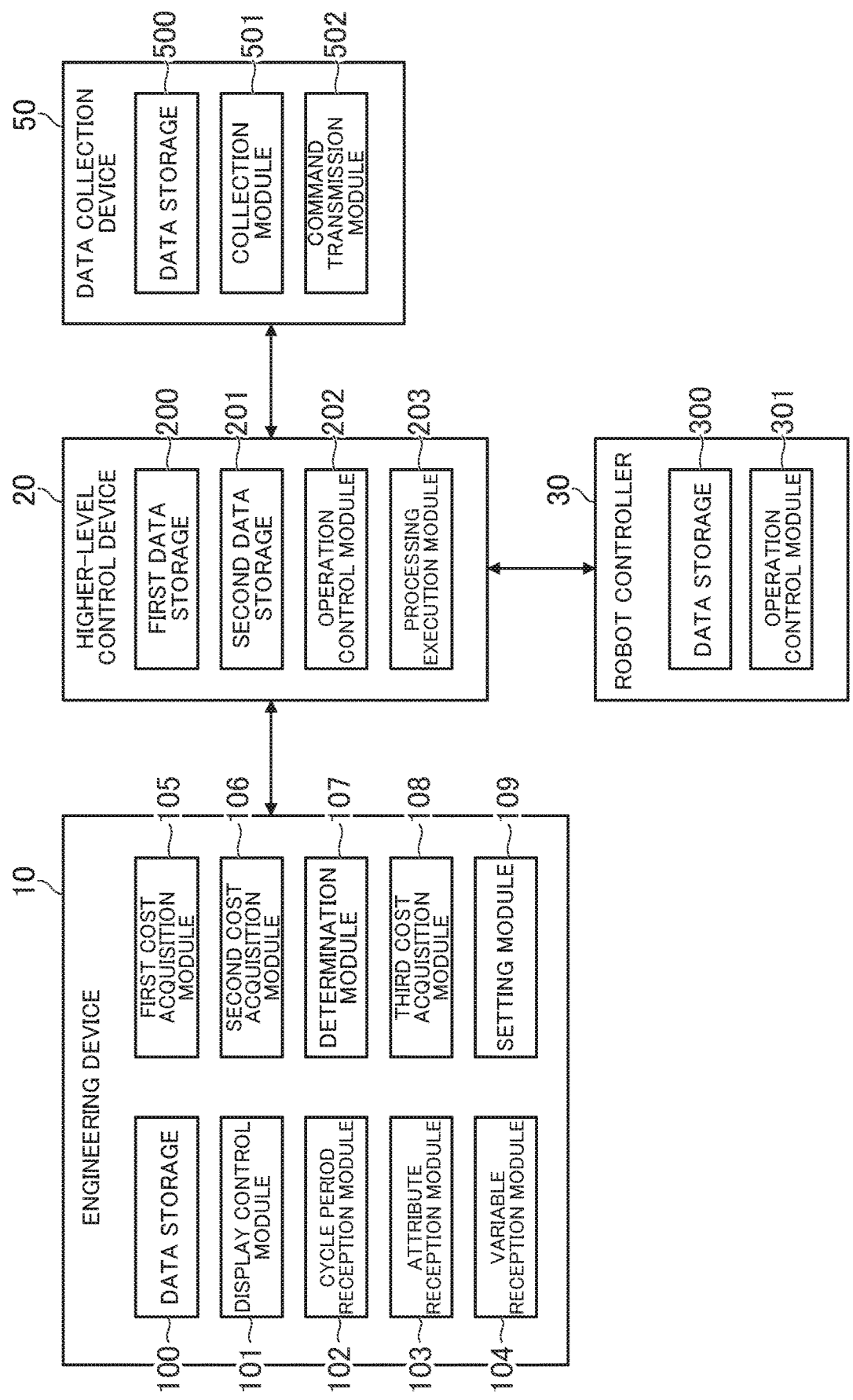
FIG. 7 is a functional block diagram for illustrating functions implemented in the production system.

FIG. 7 is a functional block diagram for illustrating functions implemented in the production system 1. In this embodiment, functions implemented in each of the engineering device 10, the higher-level control device 20, the robot controller 30, and the data collection device 50 are described.

[3-1. Functions Implemented by Engineering Device]

As illustrated in FIG. 7, the engineering device 10 includes a data storage 100, a display control module 101, a cycle period reception module 102, an attribute reception module 103, a variable reception module 104, a first cost acquisition module 105, a second cost acquisition module 106, a determination module 107, a third cost acquisition module 108, and a setting module 109.

[Data Storage]

The data storage 100 is mainly implemented by the storage 12. The data storage 100 is configured to store data required for setting the higher-level control device 20. In this embodiment, as an example of this data, setting content data D indicating the setting contents set through use of the engineering tool is described.

FIG. 8 is a table for showing a data storage example of the setting content data D. As shown in FIG. 8, the setting content data D is data indicating setting contents specified through the data sharing setting screen G. For example, the setting content data D stores the set value of the high-speed scan time, the maximum shared data size, the variable name, the unit name, the input/output information, the tiers, a collection flag, and a rewriting flag.

The set value of the high-speed scan time which is stored in the setting content data D is a numerical value specified by the user. When the user has not specified any set value of the high-speed scan time, a default value (for example, 4 ms) is stored. The maximum shared data sizes stored in the setting content data D are numerical values specified by the user when the check box C5 is turned on (under the state of the data sharing setting screen G illustrated in FIG. 5). When the user has not specified any maximum shared data sizes, default values (for example, 0 words) are stored.

The variable names stored in the setting content data D are the variable names of all or some of the variables stored in the higher-level control device 20. Each of those variables is a candidate for at least one of the collection or rewriting. Details of the variable name or the like of each variable are defined in a variable definition provided separately from the setting content data D. In this embodiment, the variable definition is not shown, but it is assumed that the variable definition is stored in the data storage 100. For example, the variable definition stores various kinds of information relating to the variables defined by the user through use of the engineering tool. The setting content data D stores the same contents as those of the variable name, the unit name, the input/output information, and the tiers that are stored in the variable definition.

The collection flag is information for identifying whether or not the variable is a variable to be collected. The variable for which the check box C1 is turned on has a first value (for example, "1") indicating that the variable is to be collected. The variable for which the check box C1 is unchecked has a second value (for example, 0) indicating that the variable is not to be collected.

The rewriting flag is information for identifying whether or not the variable is a variable to be rewritten. The variable for which the check box C2 is turned on has a first value (for example, "1") indicating that the variable is to be rewritten. The variable for which the check box C2 is unchecked has a second value (for example, 0) indicating that the variable is not to be rewritten.

The information stored in the setting content data D is not limited to the above-mentioned example. For example, when on/off states of the check boxes C3 to C6 are to be held, those states may be stored in the setting content data D. In addition, the setting content data D may store setting contents on a screen other than the data sharing setting screen G.

In the same manner, the data stored in the data storage 100 is not limited to the above-mentioned example. For example, the data storage 100 stores the engineering tool. It is assumed that the engineering tool includes a program for displaying various screens including the data sharing setting screen G and a program for calculating various costs including the usage rates of the CPU 21 on the data sharing setting screen G. Further, for example, the data storage 100 may store programs and parameters created by the user through use of the engineering tool.

[Display Control Module]

The display control module 101 causes the display 15 to display various screens of the engineering tool. In this embodiment, of those screens, the data sharing setting screen G is described. The display control module 101 is configured to display the names of the plurality of variables stored in the higher-level control device 20. For example, the display control module 101 displays, on the data sharing setting screen G, the list L showing the variable names of the variables stored in the setting content data D or the variable definition. In this embodiment, a case in which the display control module 101 also displays the unit name, the input/output information, and the tiers of each variable, is described, but the display control module 101 may display at least the variable name.

For example, the display control module 101 displays the check boxes C1 and C2 for specifying the variable together with the variable name of each variable. A method of displaying each variable in a manner that can be specified is not limited to the check box, and any other method can be used. For example, the display control module 101 may display each variable in a manner that can be specified through use of a radio button, a pull-down menu, or the like. The display control module 101 also performs display control of the usage rates of the CPU 21 and other items as well as display of the variable name. The display control of the other items is described later.

[Cycle Period Reception Module]

The cycle period reception module 102 is configured to receive the specification of the cycle period of at least one of the collection or rewriting of the specified variable. This cycle period is a time interval for performing the scan. In this embodiment, the cycle period reception module 102 receives the specification of the set value of the high-speed scan time. For example, the cycle period reception module 102 receives the specification of any numerical value with respect to the display area A2 of the data sharing setting screen G, to thereby receive the specification of the set value of the high-speed scan time. For the set value of the high-speed scan time, at least one of an upper limit value or a lower limit value may be provided, or any numerical value may be specified without particular limitations.

[Attribute Reception Module]

In this embodiment, each of the plurality of variables belongs to at least one of a plurality of attributes, and the attribute reception module 103 is configured to receive the specification of at least one of the plurality of attributes. The attribute is information indicating the class of the variable. The attribute can also be said to be information indicating the property or characteristic of the variable. In this embodiment, a case in which the tier corresponds to the attribute is described. Accordingly, the description on the tier in this embodiment can be read as "attribute." When the attributes are represented by tiers, the variable in the lower tier is represented as having a more specific class. The attribute may be information irrelevant to a hierarchical structure.

On the data sharing setting screen G, the tier name of each of a plurality of tiers is displayed, and the user can specify any tier. For example, the tier name of each tier is displayed in the window W illustrated in FIG. 6, and the attribute reception module 103 receives an operation with respect to the check box C6, to thereby receive the specification of the tier. In this embodiment, turning on the check box C6 corresponds to receiving the specification of the tier. The tier may be specified by any method other than the check box C6, and may be specified through use of, for example, a radio button or a pull-down menu.

For example, the display control module 101 filters and displays a plurality of variables belonging to a specified attribute among the plurality of variables. The display control module 101 displays the variables belonging to the specified attributes on the data sharing setting screen G without displaying the variables belonging to the unspecified attributes on the data sharing setting screen G. The filtering may not particularly be performed, and the variables belonging to the specified attributes may be collectively specified as the collection targets and the rewriting targets.

[Variable Reception Module]

The variable reception module 104 is configured to receive the specification of the variables to be subjected to at least one of the collection or rewriting from among the plurality of variables. In this embodiment, turning on the check box C1 corresponds to receiving the specification of the variable to be collected. Turning on the check box C2 corresponds to receiving the specification of the variable to be rewritten. The variable reception module 104 receives the specification of at least one variable by receiving the user's operation with respect to the list L.

In this embodiment, the higher-level control device 20 includes the CPU 21 storing each of the plurality of variables and the IoT unit 24 storing each of the plurality of variables, and the CPU 21 and the IoT unit 24 achieve consistency at a predetermined cycle period. Accordingly, the variable reception module 104 receives the specification of at least one of the variable to be collected by the data collection device 50 from the CPU 21 through intermediation of the IoT unit 24 or the variable to be rewritten from the IoT unit 24 to the CPU 21.

For example, the variable reception module 104 may receive the collective specification of a plurality of variables belonging to a specified tier. The "receiving the collective specification" means specifying a plurality of variables in one operation. In this embodiment, after the variables in the tier specified by the user are filtered and displayed, the collective specification of the variables being displayed is received through use of the check boxes C3 and C4, and hence the variable reception module 104 receives the collective specification of the plurality of variables subjected to the filtering.

Even when the displayed variables are not subjected to the filtering, the variable reception module 104 may receive the collective specification of the variables belonging to the tier specified by the user. In this case, not all the variables being displayed are collectively specified, but the collective specification of the variables belonging to the tier specified by the user among the variables being displayed may be received.

[First Cost Acquisition Module]

The first cost acquisition module 105 is configured to acquire the cost of the higher-level control device 20 which is required for at least one of the collection or rewriting of the specified variables. The cost is information relating to the load of the higher-level control device 20. In this embodiment, a case in which the cost includes at least one of a CPU usage rate of the higher-level control device 20 or a scan time of the higher-level control device 20 is described, but other information may correspond to the cost. For example, a communication load or a memory consumption amount may correspond to the cost. Those points apply to the cost to be acquired by each of the second cost acquisition module 106 and the third cost acquisition module 108.

The cost to be acquired by the first cost acquisition module 105 is the cost expected for the data sharing processing. That is, the cost acquired by the first cost acquisition module 105 can be said to be an estimated value of the actually incurred cost. It is assumed that data indicating a relationship between the variable and the cost is stored in advance in the data storage 100. This relationship may be defined in a mathematical expression format or a table format, or may be described as a part of a program code. The first cost acquisition module 105 calculates the cost based on the variables each specified as at least one of the collection target or the rewriting target and the above-mentioned relationship.

For example, the cost becomes higher as more variables are each specified as at least one of the collection target or the rewriting target. Further, for example, as the variables each specified as at least one of the collection target or the rewriting target are larger in size (number of words in this embodiment), the cost becomes higher. Further, for example, as the register storing the variables each specified as at least one of the collection target or the rewriting target is slower in read speed, the cost becomes higher. The relationship between the variable and the cost is not limited to those relationships, and any relationship may be defined.

For example, the first cost acquisition module 105 may acquire the cost based on at least one of a kind of memory storing each specified variable or a format of each specified variable. For example, the first cost acquisition module 105 calculates the cost so that the cost becomes higher when the memory storing the specified variables is a nonvolatile memory than when the memory is a volatile memory. Further, for example, the first cost acquisition module 105 calculates the cost so that the cost becomes higher as the memory storing the specified variable is slower in read speed.

Further, for example, the first cost acquisition module 105 calculates the cost so that the cost becomes relatively higher when the format of each of the specified variables is a format exhibiting a relatively larger size (number of words in this embodiment). The format exhibiting a relatively larger size is, for example, a long type, a float type, or a double type. As the format of the variable, the format defined in a program language may be used. It is assumed that the size corresponding to the format is determined in the program language.

The display control module 101 displays the cost acquired by the first cost acquisition module 105. In this embodiment, the usage rates of the CPU 21 displayed in the display area A1 and the estimated time of the data sharing processing displayed in the display area A2 with the check box C5 in an off state correspond to the cost. When other costs are to be calculated, the other costs may be displayed. When the specified variables are changed and cost is updated, the display control module 101 also updates the display of the cost.

[Second Cost Acquisition Module]

The second cost acquisition module 106 acquires the cost of the higher-level control device 20 which can be used for at least one of the collection or rewriting of the specified variables. The cost to be acquired by the second cost acquisition module 106 is an upper limit value of the cost secured or permitted for the data sharing processing. For example, the second cost acquisition module 106 acquires, as the cost, an upper limit value of the CPU usage rate that can be used for the data sharing processing and an upper limit value of the time that can be used for the data sharing processing.

In this embodiment, the CPU usage rate and the time for the data sharing are fixed based on the maximum shared data size specified by the user. Accordingly, the second cost acquisition module 106 acquires the usage rate of the CPU 21 and the required scan time as the cost based on the maximum shared data size specified by the user. It is assumed that data indicating a relationship between the maximum shared data size and each of the usage rate of the CPU 21 and the required scan time is stored in advance in the data storage 100. This relationship may be defined in a mathematical expression format or a table format, or may be described as a part of a program code. The second cost acquisition module 106 calculates the cost based on the maximum shared data size specified by the user and the above-mentioned relationship. For example, the cost becomes higher as the maximum shared data size specified by the user becomes larger.

The display control module 101 displays the cost acquired by the second cost acquisition module 106. In this embodiment, the usage rates of the CPU 21 displayed in the display area A1 and the required scan time displayed in the display area A2 with the check box C5 in an on state correspond to the cost. When other costs are to be calculated, the other costs may be displayed. When the maximum shared data size is changed and cost is updated, the display control module 101 also updates the display of the cost.

A cost acquisition method performed by the second cost acquisition module 106 is not limited to the example of this embodiment. For example, the second cost acquisition module 106 may acquire, as the cost, a value obtained by subtracting the maximum value of the high-speed scan time from the set value of the high-speed scan time. In the example of FIG. 5, the required scan time can be used up to 2 ms, and hence the second cost acquisition module 106 may acquire 2 ms as the cost.

[Determination Module]

The determination module 107 is configured to determine whether or not a predetermined condition is satisfied based on the cost acquired by the first cost acquisition module 105. The predetermined condition is a condition that the cost acquired by the first cost acquisition module 105 is equal to or larger than a threshold value. For example, the usage rate of the CPU 21 becoming equal to or larger than the threshold value or the estimated time of the data sharing processing becoming equal to or larger than the threshold value corresponds to the satisfying of the predetermined condition. The threshold value may be a fixed value, or a variable value determined based on the operation of the higher-level control device 20. In this embodiment, a case in which the usage rate of the CPU 21 is a fixed value (for example, 100%) and the estimated time of data sharing processing is a variable value (for example, a value obtained by subtracting the maximum value of the high-speed scan time from the set value of the high-speed scan time) is described.

The display control module 101 displays a predetermined alert when it is determined that the predetermined condition is satisfied. In this embodiment, the message M corresponds to an alert. It suffices that the alert is a visually recognizable image, and the alert may be an image other than the message M. For example, a predetermined icon may correspond to the alert, or blinking a part or all of the screen may correspond to the alert. The display control module 101 does not display the alert when a predetermined condition is not satisfied, and displays the alert when the predetermined condition is satisfied.

[Third Cost Acquisition Module]

The third cost acquisition module 108 is configured to acquire the cost of the higher-level control device 20 which is required for controlling the robot controller 30. The cost to be acquired by the third cost acquisition module 108 is the cost expected for the control of the robot controller 30, or the cost actually required for the control of the robot controller 30. That is, the cost to be acquired by the third cost acquisition module 108 may be the estimated value of the cost to be actually incurred, or may be the actually measured value of the actually incurred cost. In this embodiment, the third cost acquisition module 108 acquires the maximum value of the high-speed scan time as the cost.

In this embodiment, the maximum value of the high-speed scan time is the actually measured value, and hence the third cost acquisition module 108 acquires the cost being the actually measured value based on a result of the control of the robot controller 30 which has been performed by the higher-level control device 20. For example, the third cost acquisition module 108 causes the higher-level control device 20 to measure the maximum value of the high-speed scan time, and acquires the measured maximum value of the high-speed scan time as the cost from the higher-level control device 20. For example, the third cost acquisition module 108 requests the higher-level control device 20 to measure the maximum value of the high-speed scan time. When the higher-level control device 20 receives the request, the higher-level control device 20 actually executes the control program, and measures the time required for executing the control program. This time may be the time required from the first code to the last code of the control program, or may be the time required for executing a part of the codes of the control program.

The display control module 101 displays the cost acquired by the third cost acquisition module 108. In this embodiment, the maximum value of the high-speed scan time displayed in the display area A2 corresponds to the cost. When the actually measured value of the maximum value of the high-speed scan time is updated and the cost is updated, the display control module 101 also updates the display of the cost.

A cost acquisition method performed by the third cost acquisition module 108 is not limited to the example of this embodiment. For example, the maximum value of the high-speed scan time may be measured by the engineering device 10 instead of the higher-level control device 20. For example, the third cost acquisition module 108 may receive the processing result of the control program from the higher-level control device 20 and measure the maximum value of the high-speed scan time based on the received result. The third cost acquisition module 108 may measure the time from the start of execution of a given processing procedure to the end of execution of another processing procedure as the maximum value of the high-speed scan time.

Further, for example, the third cost acquisition module 108 may estimate the cost of the higher-level control device 20 which is required for controlling the robot controller 30 based on a simulator provided in advance. As the simulator itself, a known simulator can be used, and the third cost acquisition module 108 may virtually execute the control program of the higher-level control device 20, and may acquire the cost based on a result of virtually executing the control program.

[Setting Module]

The setting module 109 is configured to set at least one of the collection or rewriting of the specified variable. In this embodiment, the setting module 109 is configured to perform at least one of setting for causing the data collection device 50 to collect the specified variable or setting for rewriting the specified variable from the IoT unit 24 to the CPU 21.

The term "setting" refers to at least one of processing for causing the higher-level control device 20 to collect variable or processing for causing the higher-level control device 20 to rewrite the variable. For example, the setting module 109 transmits at least one of the variable name of the variable to be collected or the variable name of the variable to be rewritten to the higher-level control device 20. The higher-level control device 20 records the transmitted variable name in a first data storage 200, and performs at least one of the collection or rewriting of the variable indicated by the variable name.

For example, when the button B2 or B4 is selected, the setting module 109 sets the value of the collection flag of each variable in the setting content data D based on an on/off state of the check box C1 for each variable, and sets the value of the rewriting flag of each variable in the setting content data D based on an on/off state of the check box C2 for each variable. The setting module 109 transmits at least the variable name, the collection flag, and the rewriting flag in the setting content data D to the higher-level control device 20. The higher-level control device 20 records those pieces of transmitted information in the first data storage 200.

Further, for example, the setting module 109 sets so as to perform at least one of the collection or rewriting of the specified variable at the specified cycle period. When the button B2 or B4 is selected, the setting module 109 stores, in the setting content data D, the set value of the high-speed scan time specified in the display area A2. The setting module 109 transmits at least the set value of the high-speed scan time in the setting content data D to the higher-level control device 20. The higher-level control device 20 records the transmitted set value of the high-speed scan time in the first data storage 200.

[3-2. Functions Implemented by Higher-Level Control Device]

As illustrated in FIG. 7, the higher-level control device 20 includes the first data storage 200, a second data storage 201, an operation control module 202, and a processing execution module 203. The first data storage 200 is mainly implemented by at least one of the CPU 21 or the storage 22. The second data storage 201 is mainly implemented by the IoT unit 24. The operation control module 202 is mainly implemented by the CPU 21. The processing execution module 203 is mainly implemented by at least one of the CPU 21 or the IoT unit 24.

[First Data Storage]

The first data storage 200 is configured to store data for controlling the robot controller 30. For example, the first data storage 200 stores each of the plurality of variables. In this embodiment, a case in which each variable is stored in the memory in the CPU 21 of the first data storage 200 is described, but each variable may be stored in the storage 22 of the first data storage 200. The register number corresponding to each variable is determined in advance. For example, the user may use the engineering tool to set the register number corresponding to each variable, or a default register number may be set for each variable.

Further, for example, the first data storage 200 stores the control program and the parameters. Further, for example, the first data storage 200 may store firmware or another program, or may store a program for transmitting data to the data collection device 50. The operation control module 202 described later is configured to control the robot controller 30 based on those programs and parameters.

Further, for example, the first data storage 200 stores the setting contents set by the setting module 109 of the engineering device 10. The first data storage 200 stores the variable name of the variable specified as the collection target, the variable name of the variable specified as the rewriting target, and the set value of the high-speed scan time. The processing execution module 203 described later performs, based on those pieces of information, the collection of the variable specified as the collection target and the rewriting of the variable specified as the rewriting target.

[Second Data Storage]

The second data storage 201 is configured to store each of the plurality of variables. The variables stored in the second data storage 201 and the variables stored in the first data storage 200 are regularly scanned to achieve consistency therebetween. The second data storage 201 stores all or a part of the variables stored in the first data storage 200. Those variables are regularly scanned, and hence indicate the same content in principle, but there are some variables whose values do not match before the scan. The scan of the variables may be executed mainly by the CPU 21, or may be executed mainly by the IoT unit 24. The CPU 21 or the IoT unit 24 may achieve consistency between the variables stored in the first data storage 200 and the variables stored in the second data storage 201 for each scan cycle period.

[Operation Control Module]

The operation control module 202 is configured to control the operation of the robot controller 30 based on the plurality of variables and the control program. For example, the operation control module 202 sends an instruction to the robot controller 30, and the robot controller 30 operates based on the instruction. When the robot controller 30 operates based on the value of the variable associated with the device program, for example, the operation control module 202 sends, to the robot controller 30, an instruction to change the value of the variable for starting the device program.

For example, the operation control module 202 achieves consistency between a part or all of the variables stored in the first data storage 200 and a part or all of the variables stored in a data storage 300. The consistency between those variables may be regularly achieved, or may be irregularly achieved. A cycle period of the achievement of consistency between the first data storage 200 and the second data storage 201 and a cycle period of the achievement of consistency between the first data storage 200 and the data storage 300 may be the same, or may be different from each other. For example, when the higher-level control device 20 and the robot controller 30 are connected through a general network, the cycle period of the achievement of consistency between the first data storage 200 and the data storage 300 may be longer than the cycle period of the achievement of consistency between the first data storage 200 and the second data storage 201.

[Processing Execution Module]

The processing execution module 203 is configured to execute the processing involved in at least one of the collection or rewriting of the specified variable based on the setting contents set by the setting module 109. For example, the processing execution module 203 transmits, to the data collection device 50, the variable specified as the collection target among the variables stored in the first data storage 200. Further, for example, the processing execution module 203 rewrites the variable specified as the rewriting target among the variables stored in the first data storage 200 into the value instructed by the data collection device 50. Further, for example, the processing execution module 203 achieves consistency between the variables stored in the first data storage 200 and the variables stored in the data storage 201 based on the set value of the high-speed scan time specified by the user.

[3-3. Functions Implemented by Robot Controller]

As illustrated in FIG. 7, the robot controller 30 includes the data storage 300 and an operation control module 301. The data storage 300 is mainly implemented by the storage 32. The operation control module 301 is mainly implemented by the CPU 31.

[Data Storage]

The data storage 300 is configured to store the data required for the robot controller 30 to perform a predetermined operation. For example, the data storage 300 stores the device program and current values of the variables. The current values of the variables are the same as the values stored in the first data storage 200. The data storage 300 may also store the values of variables other than variables defined in the variable definition. The value of each variable is stored in a register determined in advance.

[Operation Control Module]

The operation control module 202 is configured to execute a predetermined process based on the device program stored in the data storage 300 and an instruction received from the higher-level control device 20. For example, when the higher-level control device 20 is to start a certain device program, the higher-level control device 20 transmits to the robot controller 30 an instruction to set a variable associated with the device program to a predetermined value. When the robot controller 30 receives the instruction, the robot controller 30 changes the variable to a predetermined value. When the operation control module 301 detects that the variable has been changed to the predetermined value, the operation control module 301 executes the device program associated with the variable.

[3-4. Functions Implemented by Data Collection Device]

As illustrated in FIG. 7, the data collection device 50 includes a data storage 500, a collection module 501, and a command transmission module 502. The data storage 500 is mainly implemented by the storage 52, and the collection module 501 and the command transmission module 502 are mainly implemented by the CPU 51.

[Data Storage]

The data storage 500 is configured to store data required for rewriting a variable. For example, the data storage 500 stores the collected data storing the variables collected from the higher-level control device 20. The collected data is data storing the values of the variables specified as the collection targets. The collected data may store the value of a variable at a certain time point, or may store a chronological change of the value of the variable. In addition, the collected data may store only the value of one variable, or may store the values of a plurality of variables. In another example, the data storage 500 may store an analysis program for the collected data.

[Collection Module]

The collection module 501 is configured to collect the variables specified as the collection targets. The collection unit 501 receives the variable transmitted by the higher-level control device 20 and records the variable as the collected data in the data storage 500. The higher-level control device 20 may spontaneously transmit the variable, or may transmit the variable in response to a request received from the data collection device 50.

[Command Transmission Module]

The command transmission module 502 is configured to analyze the collected data and transmit a command for rewriting the variable. The analysis of the operation refers to "analyzing the collected data." The command transmission module 502 performs the analysis by determining whether or not the collected data satisfies a predetermined condition. The predetermined condition is a condition that can be determined based on the collected data, and is, for example, whether or not a value indicated by the collected data is equal to or larger than a threshold value, or whether or not a value calculated based on the collected data is equal to or larger than a threshold value. For example, determining whether or not an abnormality has occurred in the operation corresponds to the analysis. Further, for example, determining whether or not it is required to change the value of the variable, a parameter, or firmware although no abnormality has occurred in the operation, corresponds to the analysis.

The command transmission module 502 transmits a rewrite command for the variable to the higher-level control device 20. The command transmission module 502 determines whether or not to transmit the rewrite command based on a result of analyzing the collected data. The command transmission module 502 transmits the rewrite command when the analysis result is a predetermined result. The contents of the rewrite command may be determined based on the collected data, or may include a fixed value irrespective of the collected data. In another example, the variable name and its value that are included in the rewrite command may be determined depending on the analysis result. When the higher-level control device 20 receives the rewrite command, the higher-level control device 20 rewrites the variable having the variable name included in the rewrite command into the value included in the rewrite command.

[4. Processing to be Executed in Production System]

Figure 9:
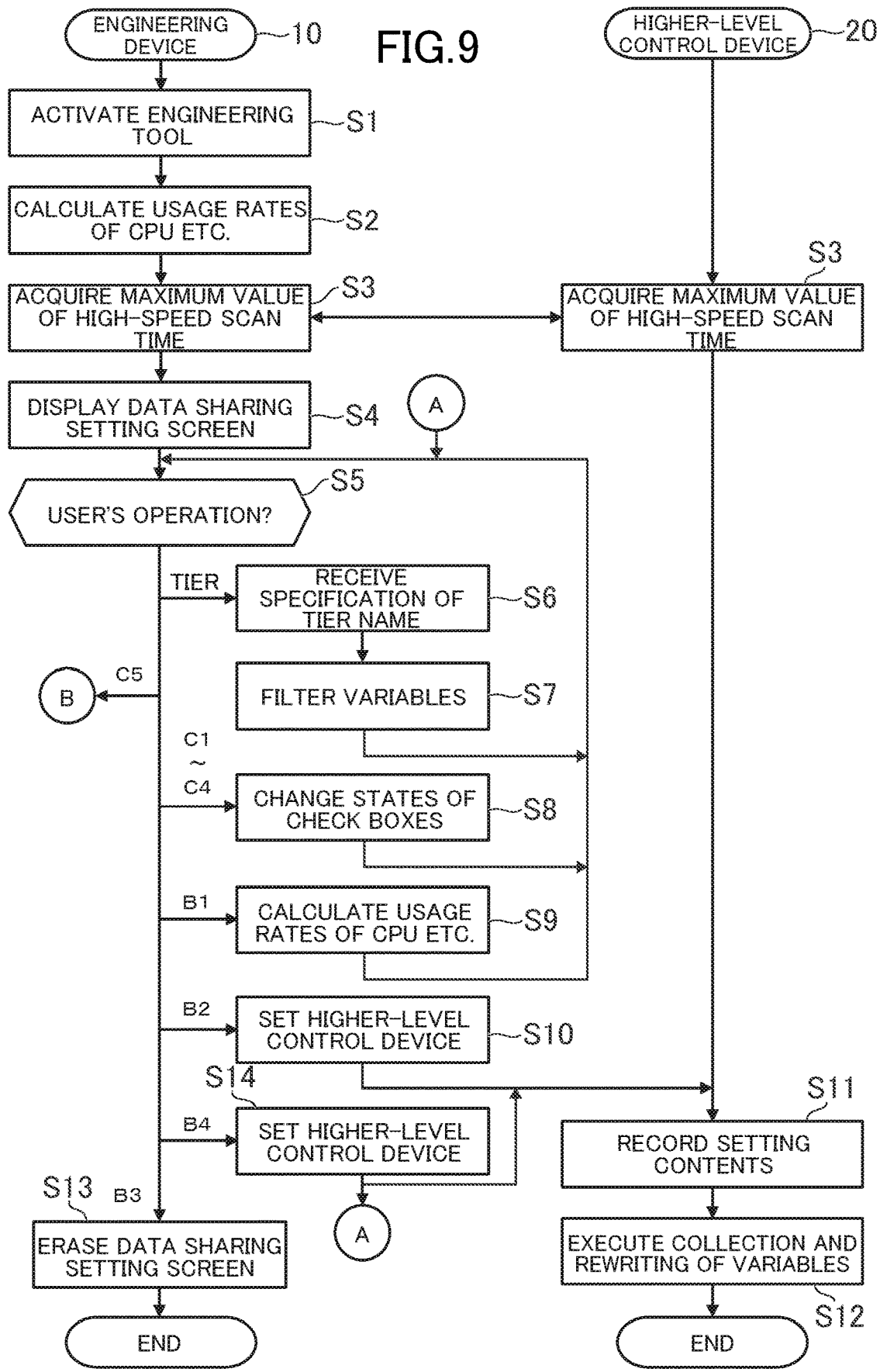
FIG. 9 is a flow chart for illustrating an example of processing to be executed in the production system.
Figure 10:
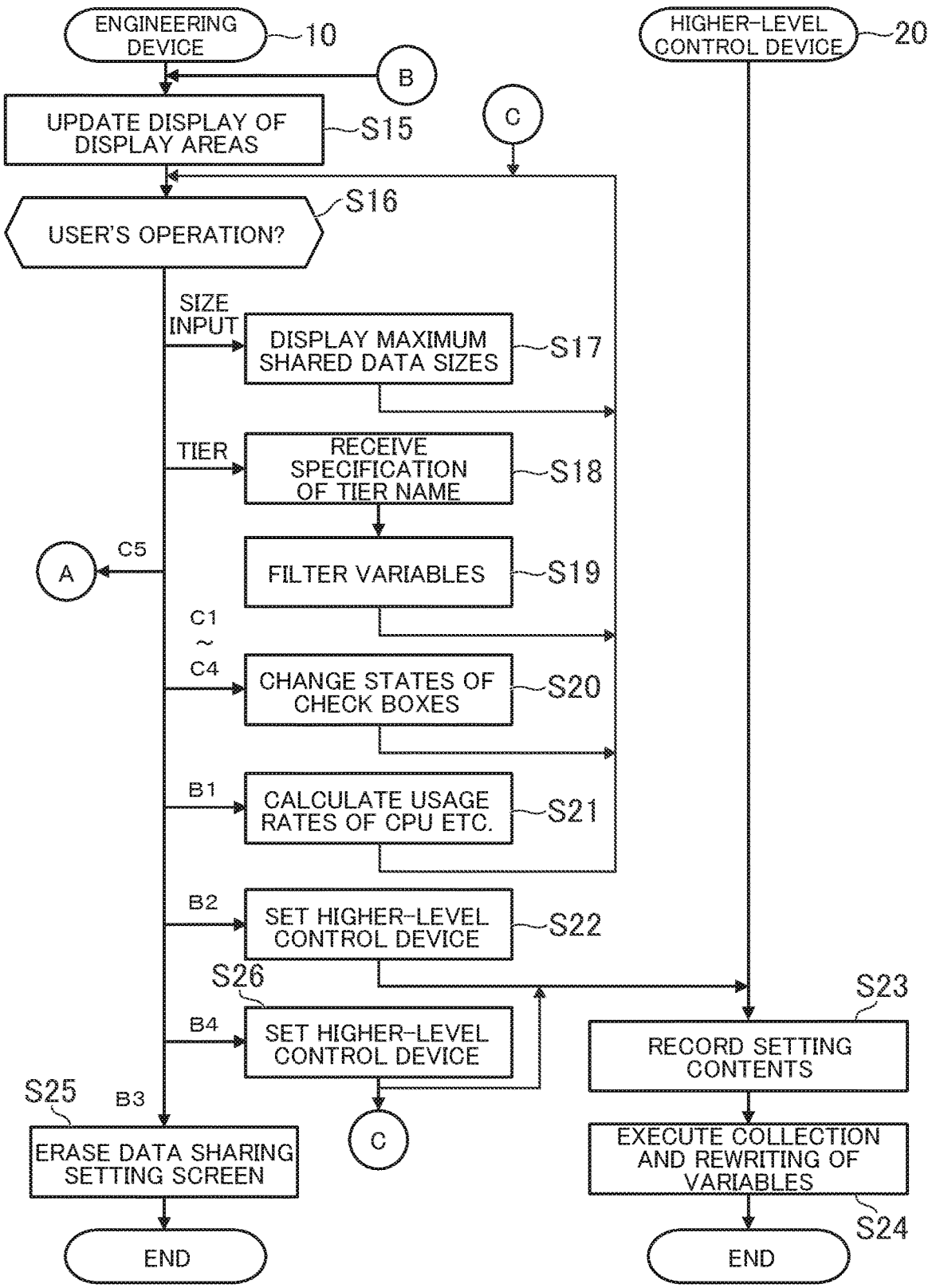
FIG. 10 is a flow chart for illustrating the example of the processing to be executed in the production system.

FIG. 9 and FIG. 10 are flow charts for illustrating an example of processing to be executed in the production system 1. In this embodiment, among processing procedures to be executed in the production system 1, processing for the user to perform the data sharing setting through use of the engineering tool is described. The processing illustrated in FIG. 9 and FIG. 10 is executed by the CPU 11 executing the engineering tool stored in the storage 12 and by the CPU 21 executing the program stored in the storage 22. The processing illustrated in FIG. 9 and FIG. 10 is an example of processing to be executed by the functional blocks illustrated in FIG. 7.

As illustrated in FIG. 9, the engineering device 10 activates the engineering tool (Step S1), and when the data sharing setting is selected from the menu screen (not shown), calculates the usage rates of the CPU 21 and the estimated time of the data sharing processing based on the setting content data D stored in the storage 12 (Step S2). In Step S2, the estimated value corresponding to the current setting content data D is calculated. When the user performs the data sharing setting for the first time, it is assumed that the setting content data D having initial values is generated based on the variable definition. In this case, as illustrated in FIG. 2, the data sharing setting screen G is displayed with all the check boxes C1 to C4 in an off state.

Processing for acquiring the maximum value of the high-speed scan time is executed between the engineering device 10 and the higher-level control device 20 (Step S3). In Step S3, the engineering device 10 inquires the maximum value of the high-speed scan time from the higher-level control device 20. The higher-level control device 20 measures the maximum value of the high-speed scan time based on a result of executing the ladder program, and transmits the actually measured value to the higher-level control device 20. It is assumed that, when the user works offline, the processing of Step S3 is not executed, and the maximum value of the high-speed scan time is displayed as 0 ms.

The engineering device 10 displays the data sharing setting screen G on the display 15 based on the estimated value calculated in Step S2 and the maximum value of the high-speed scan time which is acquired in Step S3 (Step S4). In Step S4, the engineering device 10 generates the list L based on the variable name and other information that are stored in the setting content data D. The engineering device 10 determines the on/off states of the check boxes C1 and C2 for each variable based on the collection flag and the rewriting flag that are stored in the setting content data D. The engineering device 10 also displays the usage rates of the CPU 21 which is calculated in Step S2 in the display area A1. The engineering device 10 also displays, in the display area A2, the estimated time of the data sharing processing which is calculated in Step S2, the maximum value of the high-speed scan time which is acquired in Step S3, and the set value of the high-speed scan time which is stored in the setting content data D.

The engineering device 10 identifies the user's operation based on a detection signal of the operation interface 14 (Step S5). In Step S5, a case in which any one of the specification of the tier of the variable, the operation with respect to the check boxes C1 to C5, and the operation with respect to the buttons B1 to B4 is performed is described.

When the user specifies the tier of the variable ("tier" in Step S5), the engineering device 10 displays the window W on the display 15, and receives the specification of the tier name by the user (Step S6). In Step S6, the engineering device 10 receives an operation with respect to the check box C6. The engineering device 10 filters variables based on the tier name specified by the user, updates the display of the data sharing setting screen G (Step S7), and returns to the processing of Step S5. In Step S7, the engineering device 10 executes the filtering so as to display only variables belonging to the tier of the tier name specified by the user.

When the operation with respect to any one of the check boxes C1 to C4 is performed in Step S5 ("C1" to "C4" in Step S5), the engineering device 10 changes the on/off states of the check boxes C1 to C4 based on the user's operation (Step S8), and returns to the processing of Step S5. In Step S8, when the operation with respect to the check boxes C1 and C2 for a specific variable is performed, the engineering device 10 changes the on/off states of the check boxes C1 and C2 for the specific variable. When the operation with respect to the check boxes C3 and C4 is operated, the engineering device 10 changes the on/off states of the check boxes C1 and C2 for all the variables being displayed.

When the button B1 is selected in Step S5 ("B1" in Step S5), the engineering device 10 calculates the usage rates of the CPU 21 and the estimated time of the data sharing processing based on the variables having the current check boxes C1 and C2 in an on state, updates the display of the data sharing setting screen G (Step S9), and returns to the processing of Step S5. In Step S9, the same calculation as that of Step S2 is executed.

When the button B2 is selected in Step S5 ("B2" in Step S5), the engineering device 10 updates the setting content data D stored in the storage 12 to set the higher-level control device 20, erases the data sharing setting screen G (Step S10), and this processing ends. The higher-level control device 20 records, in the storage 22, the setting contents performed in Step S10 (Step S11), and executes the collection and rewriting of the variables based on the setting contents (Step S12).

When the button B3 is selected in Step S5 ("B3" in Step S5), the engineering device 10 erases the data sharing setting screen G without setting the higher-level control device 20 (Step S13), and this processing ends. When the button B4 is selected in Step S5 ("B4" in Step S5), the engineering device 10 updates the setting content data D stored in the storage 12 to set the higher-level control device 20 (Step S14), and returns to the processing of Step S5. When the processing of Step S14 is performed, the higher-level control device 20 executes the processing of each of Step S11 and Step S12.

When the operation with respect to the check box C5 is performed in Step S5 ("C5" in Step S5), the processing advances to FIG. 10, and the engineering device 10 updates the display of the display areas A1 and A2 based on the setting content data D stored in the storage 12 (Step S15). In Step S15, the engineering device 10 displays, in the display area A1, the maximum shared data sizes presented in the current setting content data D and the usage rates of the CPU 21 corresponding to the maximum shared data sizes. The engineering device 10 also displays, in the display area A2, the required scan time corresponding to the maximum shared data sizes, the maximum value of the high-speed scan time which is acquired in Step S3, and the set value of the high-speed scan time which is stored in the setting content data D. The data sharing setting screen G returns to the state illustrated in FIG. 5.

The engineering device 10 identifies the user's operation based on a detection signal of the operation interface 14 (Step S16). In Step S16, a case in which any one of the specification of the tier of the variable, the operation with respect to the check boxes C1 to C5, the operation with respect to the buttons B1 to B4, and the specification of the maximum shared data sizes with respect to the display area A1 is performed is described.

When the user specifies the maximum shared data sizes ("size input" in Step S16), the engineering device 10 displays the maximum shared data sizes specified by the user in the display area A1 (Step S17), and returns to the processing of Step S16. When the button B1 is selected, the usage rates of the CPU 21 and the required scan time are calculated and displayed in the display areas A1 and A2.

When the operation with respect to the check box C5 is performed in Step S16 ("C5" in Step S16), the processing returns to the processing of Step S4, and the display of the display areas A1 and A2 is updated. In this case, the data sharing setting screen G returns to the state illustrated in FIG. 3. The processing from Step S18 to Step S26 to be performed when other operations are performed is the same as the processing from Step S6 to Step S14, respectively.

With the production system 1 described above, it is possible to perform at least one of the collection or rewriting of a freely-selected variable desired by the user by setting at least one of the collection or rewriting of the specified variable among the plurality of variables. In addition, at least one of the collection or rewriting of variables that is not required is not performed, and hence a processing load on the higher-level control device 20 can be reduced. When the user specifies a variable that can be subjected to at least one of the collection or rewriting without any problem, the variable that is not wished to be disclosed is prevented from being leaked to a third party, or the variable that is not wished to be rewritten is prevented from being rewritten by a third party, to thereby be able to enhance security and to prevent a malfunction from occurring in the higher-level control device 20. Moreover, variables that are not required are not collected, and hence the amount of data to be recorded in the memory can be reduced, and the amount of communication in the network can also be reduced.

The production system 1 displays the cost required for at least one of the collection or rewriting of a specified variable, to thereby allow the user to specify a variable while recognizing the cost to be incurred by the higher-level control device 20, and hence it is possible to enhance convenience of the user. It is also possible to prevent the specification of such variables as to incur an excessive cost by the higher-level control device 20, to thereby reduce the processing load on the higher-level control device 20. As a result, it is possible to prevent the control of the robot controller 30 from being hindered due to the collection and rewriting of variables.

The production system 1 can improve calculation accuracy of the cost by acquiring the cost based on at least one of the kind of memory storing the specified variables or the data format of the specified variable.

The production system 1 displays the cost that can be used for at least one of the collection or rewriting of the specified variable, to thereby allow the user to specify a variable while recognizing the usable cost, and hence it is possible to enhance the convenience of the user. It is also possible to prevent the specification of such variables as to incur a cost equal to or higher than the usable cost, to thereby reduce the processing load on the higher-level control device 20. As a result, it is possible to prevent the control of the robot controller 30 from being hindered due to the collection and rewriting of variables.

The production system 1 allows the user to specify a variable while recognizing at least one of the CPU usage rate of the higher-level control device 20 or the scan time of the higher-level control device 20, to thereby be able to enhance the convenience of the user. It is also possible to prevent the collection and rewriting of such variables as to raise the CPU usage rate of the higher-level control device 20 or extremely increase the scan time, to thereby reduce the processing load on the higher-level control device 20. As a result, it is possible to prevent the control of the robot controller 30 from being hindered due to the collection and rewriting of variables.

When it is determined that the predetermined condition is satisfied based on the cost, the production system 1 displays a predetermined alert, to thereby make it easier for the user to recognize that there is a fear in that, for example, the processing load on the higher-level control device 20 may become higher and the control of the robot controller 30 may be hindered.

The production system 1 displays the cost of the higher-level control device 20 which is required for controlling the robot controller 30, to thereby allow the user to specify a variable while recognizing the cost to be incurred by the higher-level control device 20, separately from at least one of the collection or rewriting of the variable, and hence it is possible to enhance the convenience of the user. It is also possible to prevent the collection and rewriting of such variables as to hinder the control of the robot controller 30.

The production system 1 acquires the cost of the actually measured value based on the result of the control of the robot controller 30 performed by the higher-level control device 20, to thereby be able to enhance the accuracy of the cost to be presented to the user.

The production system 1 receives the specification of a cycle period for performing at least one of the collection or rewriting of the specified variable, to thereby perform the at least one of the collection or rewriting of the specified variable at a freely-set cycle period desired by the user, and hence it is possible to improve the convenience of the user. When the at least one of the collection or rewriting is not required to be performed at such a high frequency, the production system 1 specifies a longer cycle period, to thereby be able to reduce the processing load on the higher-level control device 20. When the at least one of the collection or rewriting is desired to be performed at a high frequency, the production system 1 specifies a shorter cycle period, to thereby be able to analyze and rewrite variables with high accuracy.

The production system 1 receives the collective specification of a plurality of variables belonging to the attributes specified by the user, to thereby be able to reduce a burden to be imposed on the user when the user specifies the variables.

The production system 1 filters and displays the plurality of variables belonging to the attributes specified by the user, and displays the variables in an easy-to-recognize manner by receiving the collective specification of the plurality of variables subjected to the filtering, to thereby be able to reduce a burden to be imposed on the user when the user specifies the variables.

The production system 1 properly use the CPU 21 and the IoT unit 24 in the higher-level control device 20 to divide the roles of controlling the robot controller 30 and setting at least one of the collection or rewriting of the variable, to thereby be able to distribute the processing load.

[5. Modification Examples]

The present disclosure is not limited to the embodiment described above, and can be modified suitably without departing from the spirit of the present disclosure.

(1) For example, when the higher-level control device 20 controls each of the plurality of robot controllers 30, the display control module 101 may display a name of each of the plurality of robot controllers 30 and a name of each of the plurality of variables corresponding to the control device. In this case, the higher-level control device 20 stores a variable group for controlling the robot controller 30 for each robot controller 30. The display control module 101 displays, for each name of the robot controller 30, the variable name of each of variables included in the variable group corresponding to the robot controller 30.

For example, the display control module 101 in this modification example displays, on the data sharing setting screen G, an accordion menu including the name of the robot controller 30. When the user selects a freely-selected accordion menu, the display control module 101 opens the selected accordion menu to display the list L of variables stored in the corresponding robot controller 30. Each individual list L is as described in the embodiment. The collective specification based on the check boxes C3 and C4 becomes effective for the variables of the robot controller 30 corresponding to the opened accordion menu.

The variable reception module 104 receives the specification of variables to be subjected to at least one of the collection or rewriting from among the plurality of variables corresponding to each of the plurality of robot controllers 30. For example, the variable reception module 104 receives the specification of freely-selected variables from the variable group stored in the robot controller 30 corresponding to the opened accordion menu. A method of specifying each individual variable is as described in the embodiment. Each of the variables of the plurality of robot controllers 30 may be selectably displayed on the data sharing setting screen G without using the accordion menu.

According to Modification Example (1), when the higher-level control device 20 controls each of the plurality of robot controllers 30, the higher-level control device 20 displays the name of each of the plurality of robot controllers 30 and the name of each of the plurality of variables corresponding to the robot controller 30, to thereby facilitate the specification of the variable to be subjected to at least one of the collection or rewriting, and hence it is possible to enhance the convenience of the user.

(2) Further, for example, when the robot controller 30 executes each of the plurality of processes in order, the display control module 101 may display a name of each of the plurality of processes and a name of each of the plurality of variables corresponding to the process. In this case, the higher-level control device 20 stores a variable group for controlling the execution of the process for each process. The display control module 101 displays, for each name of the process, the variable name of each of variables included in the variable group corresponding to the process.

For example, the display control module 101 in this modification example displays, on the data sharing setting screen G, an accordion menu including the name of the process. When the user selects a freely-selected accordion menu, the display control module 101 opens the selected accordion menu to display the list L of variables of the corresponding process. Each individual list L is as described in the embodiment. The collective specification based on the check boxes C3 and C4 becomes effective for the variables of the process corresponding to the opened accordion menu.

The variable reception module 104 receives the specification of variables to be subjected to at least one of the collection or rewriting from among the plurality of variables corresponding to each of the plurality of processes. For example, the variable reception module 104 receives the specification of freely-selected variables from the variable group of the process corresponding to the opened accordion menu. A method of specifying each individual variable is as described in the embodiment. Each of the variables of the plurality of processes may be selectably displayed on the data sharing setting screen G without using the accordion menu.

According to Modification Example (2), when the robot controller 30 executes each of the plurality of processes in order, the robot controllers 30 displays the name of each of the plurality of processes and the name of each of the plurality of variables corresponding to the process, to thereby facilitate the specification of the variable to be subjected to at least one of the collection or rewriting, and hence it is possible to enhance the convenience of the user.

(3) Further, for example, the above-mentioned modification examples may be combined.

Further, for example, each of the functions described above may be implemented by any device included in the production system 1. For example, the function described as being implemented by the data collection device 50 may be implemented by the higher-level control device 20 or the robot controller 30. Further, for example, the function described as being implemented by the higher-level control device 20 may be implemented by the data collection device 50 or the robot controller 30. Further, for example, each of the functions may be implemented by one computer instead of being shared by a plurality of computers.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

What is claimed is:

1. A production system, comprising an engineering device configured to set a higher-level control device capable of controlling a control device configured to control one or more industrial machines that control one or more motors,
   wherein the higher-level control device comprises a CPU unit and a IoT unit,
   wherein the CPU unit transmits a motor control instruction for controlling the one or more motors to the one or more industrial machines,
   wherein the IoT unit transmits data that relates to the one or more motors to the engineering device or another device,
   wherein the engineering device is configured to:
      display a name of each of a plurality of variables stored in the CPU unit and the IoT unit of the higher-level control device;

receive specification of a variable to be subjected to at least one of collection or rewriting in a predetermined cycle period, from among the plurality of variables;

estimate a cost of the higher-level control device which is required for data sharing processing that is the at least one of the collection or rewriting of the specified variable, perform setting of the at least one of the collection or rewriting of the specified variable, and display the estimated cost, where in the CPU unit and the IoT unit share the specified variable by executing the data sharing processing, wherein the IoT unit transmits the data based on the shared variable to the engineering device or the other device.

2. The production system according to claim 1, wherein the engineering device is configured to acquire the cost based on at least one of a kind of memory storing the specified variable or a format of the specified variable.

3. The production system according to claim 1,
wherein the engineering device is configured to:
acquire a cost of the higher-level control device which is usable for the at least one of the collection or rewriting of the specified variable, and
display the cost of the higher-level control device which is usable for the at least one of the collection or rewriting of the specified variable.

4. The production system according to claim 1, wherein the cost includes at least one of a CPU usage rate of the higher-level control device or a scan time of the higher-level control device.

5. The production system according to claim 1,
wherein the engineering device is configured to:
determine, based on the cost, whether a predetermined condition is satisfied, and
display a predetermined alert when it is determined that the predetermined condition is satisfied.

6. The production system according to claim 1,
wherein the engineering device is configured to:
acquire a cost of the higher-level control device, which is required for controlling the control device, and
display the cost of the higher-level control device, which is required for controlling the control device.

7. The production system according to claim 6, wherein the engineering device is configured to acquire the cost of the higher-level control device, which is required for controlling the control device, which is an actually measured value, based on a result of the control of the control device which has been performed by the higher-level control device.

8. The production system according to claim 1,
wherein the engineering device is configured to:
receive specification of a cycle period for performing the at least one of the collection or rewriting of the specified variable, and
perform the setting so as to perform the at least one of the collection or rewriting of the specified variable at the specified cycle period.

9. The production system according to claim 1,
wherein each of the plurality of variables belongs to at least one of a plurality of attributes,
wherein the engineering device is configured to:
receive specification of at least one of the plurality of attributes, and
receive collective specification of a plurality of variables that belong to the specified at least one of the plurality of attributes.

10. The production system according to claim 9,
wherein the engineering device is configured to:
filter and display the plurality of variables that belong to the specified at least one of the plurality of attributes among the plurality of variables, and
receive collective specification of the filtered plurality of variables.

11. The production system according to claim 1,
wherein the higher-level control device is configured to control each of a plurality of control devices,
wherein the engineering device is configured to:
display a name of each of the plurality of control devices and a name of each of a plurality of variables corresponding to each of the plurality of control devices, and
receive specification of a variable to be subjected to the at least one of the collection or rewriting from among the plurality of variables corresponding to each of the plurality of control devices.

12. The production system according to claim 1,
wherein the control device is configured to execute each of a plurality of processes in order,
wherein the engineering device is configured to:
display a name of each of the plurality of processes and a name of each of a plurality of variables corresponding to each of the plurality of processes, and
receive specification of a variable to be subjected to the at least one of the collection or rewriting from among the plurality of variables corresponding to each of the plurality of processes.

13. The production system according to claim 1,
wherein:
the CPU unit stores each of the plurality of variables; and
the IoT unit stores each of the plurality of variables,
wherein the CPU unit and the IoT unit are configured to achieve consistency at a predetermined cycle period,
wherein the engineering device is configured to:
receive specification of at least one of a variable to be collected by a data collection device, and
perform at least one of setting for causing the data collection device to collect the specified variable or setting for rewriting the specified variable from the IoT unit to the CPU unit.

14. A production system, comprising the higher-level control device of claim 1,
wherein the higher-level control device is configured to:
store a setting content of the engineering device; and
execute processing involved in the at least one of the collection or rewriting of the specified variable based on the setting content.

15. A production method for performing engineering involved in setting of a higher-level control device capable of controlling a control device configured to control one or more industrial machines that control one or more motors, the production method comprising:
displaying a name of each of a plurality of variables stored in the CPU unit and the IoT unit of the higher-level control device;
wherein the CPU unit transmits a motor control instruction for controlling the one or more motors to the one or more industrial machines,
wherein the IoT unit transmits data that relates to the one or more motors to another device,
receiving specification of a variable to be subjected to at least one of collection or rewriting in a predetermined cycle period from among the plurality of variables;

estimating a cost of the higher-level control device which is required for data sharing processing that is the at least one of the collection or rewriting of the specified variable, performing setting of the at least one of the collection or rewriting of the specified variable, and displaying the estimated cost, wherein the CPU unit and the IoT unit share the specified variable by executing the data sharing processing, wherein the IoT unit transmits the data based on the shared variable to the another device.

16. The production method according to claim 15, further comprising executing processing involved in the at least one of the collection or rewriting of the specified variable based on the setting.

17. A non-transitory computer readable information storage medium storing a program for causing an engineering device, which is configured to set a higher-level control device capable of controlling a control device configured to control one or more industrial machines that control one or more motors, to:

display a name of each of a plurality of variables stored in a CPU unit and an IoT unit of the higher-level control device;

wherein the CPU unit transmits a motor control instruction for controlling the one or more motors to the one or more industrial machines, wherein the IoT unit transmits data that relates to the one or more motors to another device, receive specification of a variable to be subjected to at least one of collection or rewriting in a predetermined cycle period from among the plurality of variables;

estimate a cost of the higher-level control device which is required for data sharing processing that is the at least one of the collection or rewriting of the specified variable, perform setting of the at least one of the collection or rewriting of the specified variable, and display the estimated cost, wherein the CPU unit and the IoT unit share the specified variable by executing the data sharing processing, wherein the IoT unit transmits the data based on the shared variable to the engineering device or the other device.

18. The production system according to claim 1, wherein the engineering device is configured to:

acquire a cost of the higher-level control device which is usable for the at least one of the collection or rewriting of the specified variable, and display the cost of the higher-level control device which is usable for the at least one of the collection or rewriting of the specified variable.

19. The production system according to claim 2, wherein the engineering device is configured to:

acquire a cost of the higher-level control device which is usable for the at least one of the collection or rewriting of the specified variable, and display the cost of the higher-level control device which is usable for the at least one of the collection or rewriting of the specified variable.

\* \* \* \* \*